(12) United States Patent
Ikeda

(10) Patent No.: US 9,278,290 B2
(45) Date of Patent: *Mar. 8, 2016

(54) GAME SYSTEM

(71) Applicant: DeNA Co., Ltd., Tokyo (JP)

(72) Inventor: Osamu Ikeda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/609,405

(22) Filed: Jan. 29, 2015

(65) Prior Publication Data

US 2015/0141138 A1 May 21, 2015

Related U.S. Application Data

(63) Continuation of application No. 13/852,317, filed on Mar. 28, 2013, now Pat. No. 9,011,239.

(30) Foreign Application Priority Data

Jun. 14, 2012 (JP) ................................. 2012-135255

(51) Int. Cl.
*G06F 17/00* (2006.01)
*A63F 13/69* (2014.01)
(Continued)

(52) U.S. Cl.
CPC .................. *A63F 13/69* (2014.09); *A63F 13/00* (2013.01); *A63F 13/12* (2013.01); *A63F 13/75* (2014.09); *A63F 13/79* (2014.09); *A63F 13/792* (2014.09); *A63F 2300/575* (2013.01)

(58) Field of Classification Search
USPC ......................................... 463/16–25, 29–31
See application file for complete search history.

(56) References Cited

U.S. PATENT DOCUMENTS 7,491,124 B2  2/2009  Tanaka et al. .................. 463/42
8,469,818 B2  6/2013  Tanaka et al. .................. 463/42
(Continued)

FOREIGN PATENT DOCUMENTS

JP  2002-315970  10/2002
JP  2003-023661  1/2003
(Continued)

OTHER PUBLICATIONS

Japanese Office Action mailed on Mar. 10, 2015 in connection with Japanese Patent Application No. 2014-257716 and English translation thereof.
(Continued)

*Primary Examiner* — Ronald Laneau
(74) *Attorney, Agent, or Firm* — Pillsbury Winthrop Shaw Pittman LLP

(57) ABSTRACT

One object is to provide a video game system that can technically restrain real money trade. In accordance with one aspect, a server device 10 according to an embodiment of the present invention includes: a determination unit 58 configured to determine whether an exchange of exhibited game contents and bid game contents is concluded based on a game content parameter value characterizing the exhibited game contents and the game content parameter value characterizing the bid game contents; and an updating unit 61 configured to update an owned game content storage unit 52 such that, only when the determination unit 58 determines that the exchange is concluded, the exhibited game contents are stored in association with player identification information of a bidder player and the bid game contents are stored in association with player identification information of an exhibitor player.

9 Claims, 14 Drawing Sheets

(51) Int. Cl.
*A63F 13/00* (2014.01)
*A63F 13/30* (2014.01)
*A63F 13/75* (2014.01)
*A63F 13/792* (2014.01)
*A63F 13/79* (2014.01)

(56) References Cited

U.S. PATENT DOCUMENTS

| | | | |
|---|---|---|---|
| 8,628,419 B2 | 1/2014 | Tanaka et al. | 463/40 |
| 8,632,404 B2 | 1/2014 | Tanaka et al. | 463/39 |
| 8,636,595 B2 | 1/2014 | Tanaka et al. | 463/39 |
| 8,641,527 B2 | 2/2014 | Tanaka et al. | 463/39 |
| 8,647,205 B2 | 2/2014 | Tanaka et al. | 463/39 |
| 9,053,610 B2 * | 6/2015 | Kelly et al. | |
| 9,082,260 B2 * | 7/2015 | Kelly et al. | |
| 2002/0160838 A1 * | 10/2002 | Kim | 463/42 |
| 2003/0008714 A1 * | 1/2003 | Tajiri et al. | 463/43 |
| 2013/0196771 A1 | 8/2013 | Tanaka et al. | 463/41 |
| 2013/0303266 A1 | 11/2013 | Kishimoto et al. | 463/25 |
| 2013/0310169 A1 | 11/2013 | Satsuma | 463/30 |
| 2013/0316835 A1 | 11/2013 | Takagi et al. | 463/42 |
| 2014/0066211 A1 | 3/2014 | Tanaka et al. | 463/42 |
| 2014/0073437 A1 | 3/2014 | Tanaka et al. | 463/42 |

FOREIGN PATENT DOCUMENTS

| | | |
|---|---|---|
| JP | 2003-036356 | 2/2003 |
| JP | 2005-028103 | 2/2005 |
| JP | 2007-018202 | 1/2007 |
| JP | 2008-173391 | 7/2008 |
| JP | 2009-187143 | 8/2009 |
| JP | 5671642 | 2/2015 |

OTHER PUBLICATIONS

Japanese Office Action mailed on Apr. 8, 2014 in connection with Japanese Patent Application No. 2012-135255 and English translation.

Japanese Office Action issued on Aug. 19, 2014 in Japanese Patent Application No. 2014-107944, which is a divisional application from Japanese Patent Application No. 2012-135255, and English translation thereof.

Isao Moriyasu, "Certificate for Application of Provision of Exception to Lack of Novelty on Invention" with English translation, date of submission Jul. 9, 2012, 71 pages.

* cited by examiner

| Player Identification Information | Game Content Identification Information 1 | Game Content Identification Information 2 | Game Content Identification Information 3 | Game Content Identification Information 4 | ... | Game Content Identification Information 50 |
|---|---|---|---|---|---|---|
| 000001 | 00000001 | 00000125 | 00000130 | 00000135 | ... | 20300209 |
| 000002 | 00000005 | 20000012 | 20000015 | 20000018 | ... | 21008901 |
| 000003 | 10000001 | 10030004 | N/A | N/A | ... | 25006104 |
| 000004 | 10000042 | 10201002 | N/A | N/A | ... | N/A |
| 000005 | N/A | 00000005 | 10000031 | N/A | ... | N/A |
| ... | ... | ... | ... | ... | ... | ... |

Owned Game Content Management Table

| Game Content Indetification Information | Rarity Value | Offensive Power | Defensive Power | Mobility | Name | Image | ... |
|---|---|---|---|---|---|---|---|
| 00000001 | 1 | 114 | 86 | 102 | Machine B | http://mmmbbb/bbb.jpg | ... |
| 00000002 | 3 | 152 | 57 | 187 | Vehicle A | http://vvvaaa.aaa.jpg | ... |
| 00000003 | 2 | 95 | 88 | 41 | Vehicle B | http://mmmccc/ccc.jpg | ... |
| 00000004 | 1 | 98 | 95 | 193 | Machine E | http://mmmddd/ddd.jpg | ... |
| 00000005 | 4 | 921 | 857 | 689 | Machine D | http://mmmeee/eee.jpg | ... |
| ... | ... | ... | ... | ... | ... | ... | ... |
| 000000125 | 1 | 30 | 50 | 120 | Machine A | http://mmmasa/aaa.jpg | |
| ... | ... | ... | ... | ... | ... | ... | ... |
| 10000031 | 1 | 125 | 102 | 68 | Machine C | http://mmmccc/ccc.jpg | ... |
| ... | ... | ... | ... | ... | ... | ... | ... |

Game Content Parameter Management Table

Fig. 5

| Player Identification Information | Player Name | Avatar | ... |
|---|---|---|---|
| 000001 | chapin | http://aaaaaaa/aaa.jpg | ... |
| 000002 | Yuki | http://bbbbbb/bbb.jpg | ... |
| 000003 | Azusa | http://ccccccc/ccc.jpg | ... |
| 000004 | Riku | http://dddddd/ddd.jpg | ... |
| 000005 | Akiko | http://eeeeee/eee.jpg | ... |
| ... | ... | ... | ... |

Player Specifying Information Management Table

Fig. 6

| Trade ID | Exhibitor Player Identification Information | Exhibited Game Content | Exhibited Number | Desired Condition 1 | Desired Condition 2 | Exhibition Period | Bid Game Content |
|---|---|---|---|---|---|---|---|
| A000001 | 000001 | 00000125 | 1 | N/A | N/A | April 9 9:00 | 00000131 |
| A000002 | 000001 | 00000001 | 1 | N/A | N/A | April 10 12:00 | 20010921 |
| A000003 | 000004 | 10000042 | 3 | ITEM53 | 131 | April 9 14:51 | N/A |
| A000004 | 002987 | 33890421 | 2 | N/A | N/A | April 11 18:00 | N/A |
| A000005 | 010812 | 20500911 | 10 | ITEM01 | 020 | April 10 9:15 | 10320552 |
| ... | | ... | | ... | ... | ... | ... |

Exhibition Request Management Table

Fig. 7

| Player Name | Player Identification Information | Group Identification Information |
|---|---|---|
| Player 1 | 000001 | 01 |
| Player 2 | 000002 | 02 |
| Player 3 | 000003 | 01 |
| Player 4 | 000004 | 02 |
| Player 5 | 000005 | 01 |

Fig. 15a

| Player Name | Player Identification Information | Group Identification Information |
|---|---|---|
| Player 1 | 000001 | 01 |
| Player 2 | 000002 | 01 |
| Player 3 | 000003 | 02 |
| Player 4 | 000004 | 02 |
| Player 5 | 000005 | 02 |

Fig. 15b

| Group Name | Access-enabled Group 1 | Access-enabled Group 2 | Access-enabled Group 3 |
|---|---|---|---|
| Group 1 | Group 1 | Group 5 | Group 21 |
| Group 2 | Group 2 | Group 3 | Group 13 |
| Group 3 | Group 3 | Group 7 | Group 9 |
| Group 4 | Group 4 | Group 9 | Group 10 |
| Group 5 | Group 5 | Group 1 | Group 8 |
| ... | ... | ... | ... |

Fig. 16a

| Group Name | Access-enabled Group 1 | Access-enabled Group 2 | Access-enabled Group 3 |
|---|---|---|---|
| Group 1 | Group 1 | Group 3 | Group 19 |
| Group 2 | Group 2 | Group 4 | Group 8 |
| Group 3 | Group 3 | Group 1 | Group 20 |
| Group 4 | Group 4 | Group 2 | Group 15 |
| Group 5 | Group 5 | Group 7 | Group 11 |
| ... | ... | ... | ... |

Fig. 16b

|  | Player Identification Information | Company 1 | Company 2 | Company 3 |
|---|---|---|---|---|
| Player 1 | 000001 | 000002 | 000005 | N/A |
| Player 2 | 000002 | 000001 | 000015 | N/A |
| Player 3 | 000003 | N/A | N/A | N/A |
| Player 4 | 000004 | 000009 | 001203 | 001945 |
| Player 5 | 000005 | 000001 | N/A | N/A |

Fig. 17

GAME SYSTEM

CROSS-REFERENCE TO RELATED APPLICATIONS

This application is based on and claims the benefit of priority from Japanese Patent Application Serial No. 2012-135255 (filed on Jun. 14, 2012), the contents of which are hereby incorporated by reference in their entirety.

TECHNICAL FIELD

The present invention relates to a video game system.

BACKGROUND

So-called online games have become popular, wherein a server device provides game data to terminal devices via a network and the terminal devices perform game functions using the provided game data.

Some online games may provide functions for exchanging virtual in-game cards and items (e.g., weapons) between the players so as to encourage interaction between players. One method of exchanging in-game items between players is discussed in Japanese Patent Application Publication No. 2009-187143 (the "'143 Publication").

SUMMARY

As discussed in the '143 Publication, some players sell and buy game contents such as in-game cards and items in real currency. Such a trade in real currency is called "real money trade" or RMT. If such real money trade is left uncontrolled, only part of players can play the game with a noticeably advantageous condition, which may cause loss of game balance. In order to tackle this problem, online game providers prohibit real money trade in the user agreement and suspend play of the game for users who has violated the user agreement, thereby trying to restrain the real money trade.

However, even with strict application of such user agreement, there have been challenges to fully restrain real money trade. To overcome this challenge, one object of the present invention is to provide a video game system that can restrain real money trade from a technical aspect. Other objects of the present invention will be described in the entirety of this specification.

A video game system according to an embodiment of the present invention is a video game system for providing video games to terminal devices of one or more players via a network, the video game system comprising: an owned game content storage unit configured to store one or more first game contents owned by a first player among the one or more players in association with first player identification information identifying the first player, and to store one or more second game contents owned by a second player among the one or more players in association with second player identification information identifying the second player; an exhibition request obtaining unit configured to obtain from the first player an exhibition request for exhibiting the first game contents; an exchange request obtaining unit configured to obtain from the second player an exchange request for exchanging the second game contents for the first game contents; a determination unit configured to determine whether an exchange of the first game contents and the second game contents is concluded based on a first game content parameter value characterizing the first game contents and a second game content parameter value characterizing the second game contents when the exchange request obtaining unit obtains the exchange request; and an updating unit configured to update the owned game content storage unit such that the first game contents are stored in association with the second player identification information and the second game contents are stored in association with the first player identification information only when the determination unit determines that the exchange is concluded. A video game system according to another embodiment of the present invention is a video game system for providing video games to terminal devices of one or more players via a network, the video game system comprising: an owned game content storage unit configured to store one or more first game contents owned by a first player among the one or more players in association with first player identification information identifying the first player, and to store one or more second game contents owned by a second player among the one or more players in association with second player identification information identifying the second player; an exhibition request obtaining unit configured to obtain from the first player an exhibition request for exhibiting the first game contents; an exchange request obtaining unit configured to obtain from the second player an exchange request for exchanging the second game contents for the first game contents; a determination unit configured to determine whether an exchange of the first game contents and the second game contents is concluded based on a trade quantity of the first game contents and a trade quantity of the second game contents when the exchange request obtaining unit obtains the exchange request; and an updating unit configured to update the owned game content storage unit such that the first game contents are stored in association with the second player identification information and the second game contents are stored in association with the first player identification information only when the determination unit determines that the exchange is concluded.

A method according to an embodiment of the present invention is a method using a game computer for providing video games to terminal devices of one or more players via a network, the method comprising the steps of: storing one or more first game contents owned by a first player among the one or more players in association with first player identification information identifying the first player, and storing one or more second game contents owned by a second player among the one or more players in association with second player identification information identifying the second player; obtaining from the first player an exhibition request for exhibiting the first game contents; obtaining from the second player an exchange request for exchanging the second game contents for the first game contents; determining whether an exchange of the first game contents and the second game contents is concluded based on a first game content parameter value characterizing the first game contents and a second game content parameter value characterizing the second game contents when the exchange request obtaining unit obtains the exchange request; and updating the owned game content storage unit such that the first game contents are stored in association with the second player identification information and the second game contents are stored in association with the first player identification information only when the determination unit determines that the exchange is concluded. A method according to another embodiment of the present invention is a method using a game computer for providing video games to terminal devices of one or more players via a network, the method comprising the steps of: storing one or more first game contents owned by a first player among the one or more players in association with first player identification information identifying the first player, and storing one or more second game contents owned by a second player among the one or more players in association with second player identification information identifying the second player; obtaining from the first player an exhibition request for exhibiting the first game contents; obtaining from the second player an exchange request for exchanging the second game contents for the first game contents; determining whether an exchange of the first game contents and the second game contents is concluded based on a trade quantity of the first game contents and a trade quantity of the second game contents when the exchange request obtaining unit obtains the exchange request and updating the owned game content storage unit such that the first game contents are stored in association with the second player identification information and the second game contents are stored in association with the first player identification information only when the determination unit determines that the exchange is concluded.

Various embodiments of the present invention provide a video game system that technically restrains real money trade.

BRIEF DESCRIPTION OF THE DRAWINGS

FIG. 5 shows an example of game content parameter management table used in a video game system according to an embodiment of the present invention.

FIG. 6 shows an example of player specifying information management table used in a game system according to an embodiment of the present invention.

FIG. 7 shows an example of exhibition request management table used in a game system according to an embodiment of the present invention.

FIGS. 15a and 15b show examples of group management table used in a video game system according to an embodiment of the present invention.

FIGS. 16a and 16b show examples of group classification table used in a video game system according to an embodiment of the present invention.

FIG. 17 shows an example of player management table used in a video game system according to an embodiment of the present invention.

DESCRIPTION OF EXAMPLE EMBODIMENTS

Figure 1:
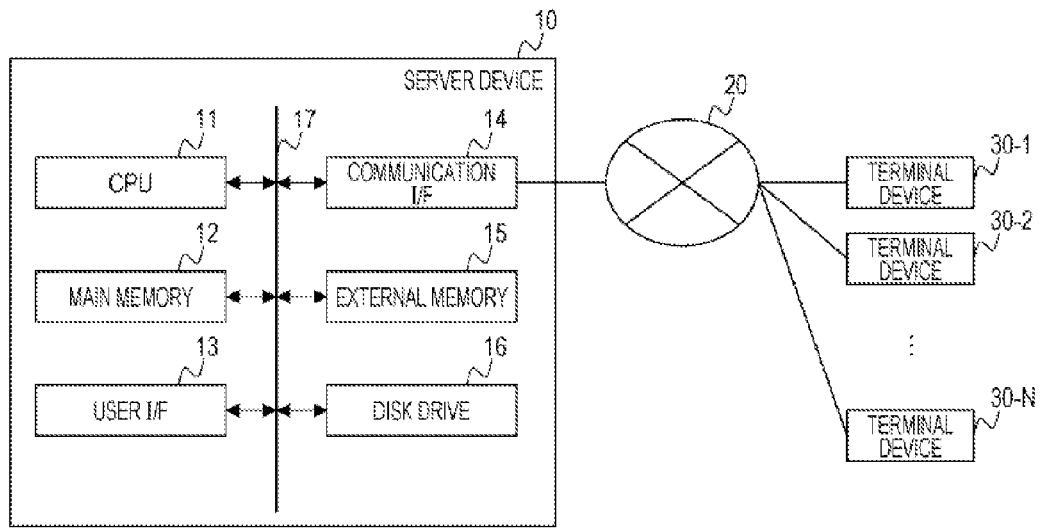
FIG. 1 is a block diagram schematically illustrating the architecture of a video game system according to an embodiment of the present invention.

Various embodiments of the present invention will be described hereinafter with reference to the appended drawings. In the drawings, the same components are denoted by the same reference numerals.

FIG. 1 is a block diagram schematically illustrating a video game system according to an embodiment of the present invention. As illustrated in FIG. 1, in the embodiment of the present invention, an online game server device 10 (hereinafter also referred to simply as the "server device 10") may be communicatively connected to a plurality of terminal devices 30-1, 30-2, ... , and 30-N (hereinafter also collectively referred to as the "terminal devices 30"), each having a communication function, via a communication network 20 such as the Internet. The server device 10 is an example of a device implementing part or all of a video game system according to an embodiment of the present invention.

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11.

The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and store various programs such as a control program for controlling the progress of an online game. The external memory 15 may also store various data used in the game. The external memory 15 may contain, for example, an owned game content management table, a game content parameter management table, an exhibition request management table, a player specifying information management table, a group management table, a group classification table, and a player management table; these tables, which will be described later, may store various data in accordance with progression of the game. Also, these tables may be stored on a database server communicatably connected to the server device 10 and physically separate from the server device 10.

The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, a game application and data such as game data stored in a storage medium may be read by the disk drive 16, and may be installed into the external memory 15.

In an embodiment, the server device 10 may be a web server for managing a web site including a plurality of hierarchical web pages and may be capable of providing the terminal devices 30 with game services. The terminal devices 30 may be provided with browser software that fetches and analyzes HTML data for rendering a web page to present the web page to a user (a player of the game) of the terminal devices 30. A game provided through a web page rendered by such browser software is sometimes called a browser game. The HTML data for rendering the web page may also be stored on the external memory 15. HTML data may comprise HTML documents written in markup languages such as HTML; the HTML documents can be associated with various images by using tags. Additionally, the HTML documents can include programs written in script languages such as ActionScript™ and JavaScript™.

The external memory 15 may store game applications to be executed on execution environments of the terminal device 30 other than browser software. This game application may include game programs for performing a game and various data such as image data to be referred to for executing the game programs. The game programs may be created in, for example, object oriented languages such as Objective-C™ and Java™. The created game programs may be stored on the external memory 15 in the form of application software along with various data. The application software stored on the external memory 15 may be delivered to a terminal device 30 in response to a delivery request. The application software delivered from the server device 10 may be received by the terminal device 30 through a communication I/F 34 in accordance with the control of CPU 31; the received game programs may be sent to an external memory 35 and stored thereon. The application software may be launched in accordance with the player's operation on the terminal device 30 and may be executed on a platform implemented on the terminal device 30 such as NgCore™ or Android™. The server device 10 may provide the game applications executed on the terminal devices 30 with various data required for progression of the games. Additionally, the server device 10 can store various data sent from the terminal device 30 for each player, thereby managing the progression of the game for each player.

Thus, the server device 10 may manage the web site for providing game services and deliver web pages constituting the web site in response to a request from the terminal device 30, thereby progressing the game. Also, the server device 10 can progress a game by communicating various data to and from a game application performed on the terminal device 30 in place of, or in addition to, such a browser game. Whichever mode may be taken to provide the game, the server device 10 can store data required to progress the game for each identification identifying a player (described later). The games provided by the server device 10 may include desired games such as action games, roll playing games, interactive baseball games, and card games. The types of the games implemented by the web site or game applications of the server device 10 are not limited to those explicitly described herein.

In an embodiment, the terminal device 30 may be a desired information processing device capable of rendering, on a web browser, web pages of a game web site fetched from the server device 10; for example, the client device 30 may be a mobile phone, smart phone, game console, personal computer, touch pad, or electronic book reader, but is not limited thereto. In another embodiment, the terminal device 30 may be a desired information processing device including an application execution environment for executing a game application.

Figure 2:
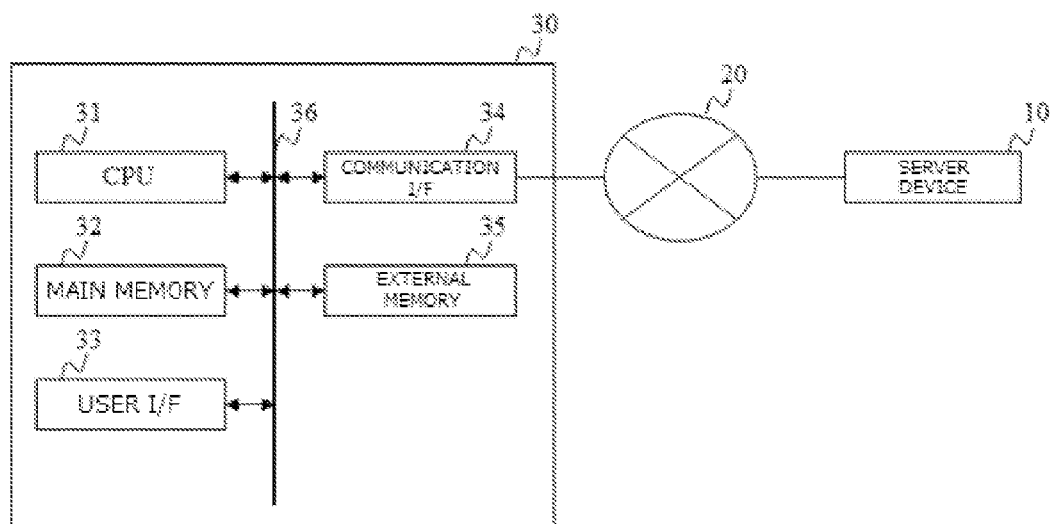
FIG. 2 is a block diagram schematically illustrating the architecture of a terminal device used in a video game system according to an embodiment of the present invention.

The architecture of the terminal device 30 will be described with reference to FIG. 2. FIG. 2 is a block diagram schematically illustrating the architecture of a terminal device 30. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may store a program to be executed by the CPU 31, and may be formed of, for example, a dynamic random access memory (DRAM).

The user I/F 33 may include, for example, an information input device such as a touch panel, a keyboard, a button, and a mouse for accepting an input from a player (user), and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving a game application from the server device 10 via the communication I/F 34, the external memory 35 may store the received game application.

A terminal device 30 having such an architecture may include browser software for interpreting and rendering an HTML file (HTML data) for example; this browser software may enable the terminal device 30 to interpret the HTML data fetched from the server device 10 and render web pages corresponding to the received HTML data. Further, the terminal device 30 may include plug-in software (e.g., Flash Player distributed by Adobe Systems Incorporated) (FLASH is a trademark) embedded into browser software; therefore, the client device 30 can fetch from the server device 10 a SWF file embedded in HTML data and execute the SWF file by using the browser software and the plug-in software.

When a game is executed, for example, animation or an operation icon designated by the program may be displayed on a screen of the terminal device 30. The player may enter an instruction for causing the game to progress using an input interface (e.g., a touch screen or a button) of the terminal device 30. The instruction entered by the player may be transmitted to the server device 10 through the browser of the terminal device 30 or a platform function such as NgCore™.

Figures 3, 4:
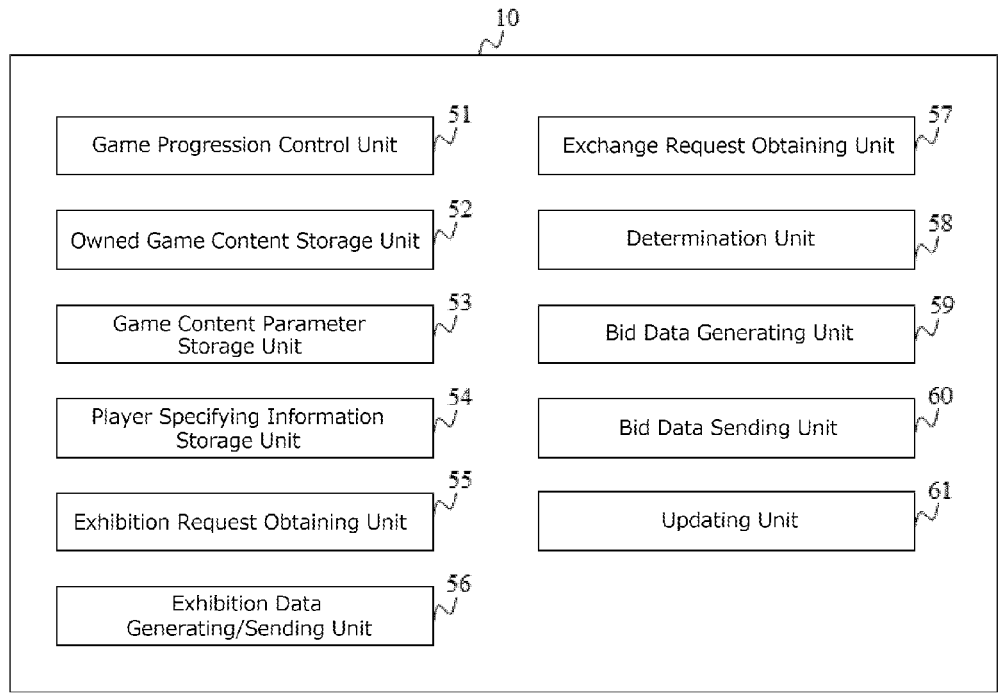
FIG. 3 is a block diagram schematically illustrating the functionality of a server device used in a video game system according to an embodiment of the present invention.
FIG. 4 shows an example of owned game content management table used in a video game system according to an embodiment of the present invention.

Next, the functionality of the server device 10 implemented by the components shown in FIG. 1 will be described with reference to FIG. 3. FIG. 3 is a block diagram illustrating the functionality of a server device 10 according to an embodiment of the present invention. As shown in FIG. 3, the server device 10 according to the embodiment may include some or all of a game progression control unit 51, an owned game content storage unit 52, a game content parameter storage unit 53, a player specification information storage unit 54, an exhibition request obtaining unit 55, an exhibition data generating/sending unit 56, an exchange request obtaining unit 57, a determination unit 58, a bid data generating unit 59, a bid data sending unit 60, and an updating unit 61. The server device 10 may also include a charging unit configured to authenticate a player at start of the game and perform charging process in accordance with progression of the game. These functions may be implemented by the CPU 11 controlling the loading of a certain program onto a main memory 12 and performing operations based on the instructions in the program.

The game progression control unit 51 may send and receive various data required for the progression of the game to and from the terminal device 30 and manage such data for each player, thereby controlling the progression of the game for each player. For example, the game progression control unit 51 can sequentially display, on the terminal device 30, each of web pages constituting a web site for providing game services in response to a request from the terminal device 30. For example, when a hyperlink on the displayed web page is selected by the player, the game progression control unit 51 may send new HTML data corresponding to the hyperlink to the terminal device 30. The terminal device 30 may display a web page corresponding to the received HTML data. Thus, the game progression control unit 51 may control the game such that web pages stored on the server device 10 are sequentially displayed on the terminal device 30 in accordance with the operation by the player; and the player can progress the game by operating the terminal device 30.

When the terminal device 30 executes the game application, the game progression control unit 51 can sequentially send various data used in the game to the game application. For example, when receiving from a game application on the terminal device 30 a control signal indicating that a certain mission has been fulfilled, the game progression control unit 51 may provide the game application with various parameters related to a mission subsequent to the fulfilled mission. The game application may load the data provided by the server device 10 and progress the game.

The terminal device 30 can appropriately send to the server device 10 various information on progression of the game such as information indicating various parameter values used in the game (e.g., information on earned game points and earned items) and information indicating a status (e.g., information specifying a fulfilled mission), through the function of browser software or the game application. The game progression control unit 51 may store, for each player, information on the progression of the game received from a plurality of terminal devices 30, thereby controlling the progression of the game for each player. Thus, when the player logs in the server device 10 using his own ID, the game may be resumed from the scene corresponding to the progression for the player (e.g., the scene where the game was interrupted) based on the information on the progression of the game associated with the player stored in the server device 10. The information necessary for progression of the game may be managed by various functions of the server device 10 or a separate device communicatively connected to the server device 10, as well as by the function of the game progression control unit 51.

The terminal device 30 may perform various games in cooperation with the server device 10. The games performed on the terminal device 30 use various game contents such as electronic cards, characters, items, and virtual currency used in the games. The term "game contents" collectively refers to electronic data used by players in the games and including, for example, cards, items, characters, and avatars. In an embodiment of the present invention, the game contents may be obtained, owned, used, managed, exchanged, fused, reinforced, sold, discarded, and/or presented by players in the games in accordance with progression of the games; and the use of the game contents is not limited to those explicitly described herein. In trading of cards in a game, a player may be paid in virtual currency used in the game, not in real currency. The game contents have parameters (e.g., "rarity," "offensive power," "defensive power," and "the name of the game content") referred to on, e.g., battles with other player characters and non-player characters and on challenge for a quest. Herein, digitized game content parameters may also be referred to as "parameter value," "game content parameter values," "parameter values assigned to game contents," or "parameter values of game contents." In embodiments of the present invention, at least part of parameters assigned to game contents may be updated in accordance with progression of the game.

A player can progress the game using the game contents having updated parameters.

The games provided by the server device 10 according to an embodiment of the present invention may include so-called card games. In the card game, a player can use one or more his own cards to fulfill a mission or combat other players or non-player characters, thereby progressing the game. The Applicant provides various card games on Mobage™ platform.

The owned game content storage unit 52 may store game contents owned by players each associated with player identification information that identifies the player. The owned game content storage unit 52 may be implemented by an owned game content management table provided on, for example, an external memory 15 or an external database server. The owned game content management table may store game content identification information that identifies a game content owned by each player in association with player identification information that identifies the player. FIG. 4 shows an example of the owned game content management table. As shown, the owned game content management table may store up to 50 types of game contents owned by a player in association with player identification information that identifies the player. Additionally, if a player can own a plurality of same type of game contents, the owned game content management table may store owned number of the game contents in association with the game content identification information identifying the plurality of owned game contents. In the owned game content management table shown in FIG. 4, "N/A" represents that no game content is owned.

As stated above, a player may own a different set of game contents after the player obtains, sells, or discards a game content. The owned game content storage unit 52 may store game content identification information unique to a game content in "dynamic" association with player identification information unique to the player, so that the change of an owner of a game content may be reflected. That is, when the owner of a game content is changed from one player to another, the association between the game content identification information of the game content and the player identification information may be altered so that the change of the owner of the game content may be reflected. By way of an example, in case where players exchange game contents in a game, the association between the game content identification information and the player identification information in the owned game content identification information storage unit 52 may be altered so as to reflect the changes of the owners of the game contents caused by the exchange. In an embodiment, such alteration may be made by the updating unit 61.

"Player identification information" may include an identification code that identifies a player of a game and may be composed of, for example, a six-digit number. The code system of the player identification information is not limited to those explicitly described herein and may be configured desirably. For example, the player identification information may also include an alphabetic character. Typically, the player identification information may be assigned to a player, for example, when the player first logs in or signs up for a game, and may be reused for later logins of the player. Thus, the player identification information may be unique to a player and identifies the player in a game.

"Game content identification information" may include an identification code that identifies a game content (or the type of a game content) owned by a player and may be composed of, for example, an alphabetic character and a six-digit number. The code system of the game content identification information is not limited to those explicitly described herein and may be configured desirably.

As described above, game contents may have "parameters" assigned thereto, which may be various information that characterizes the corresponding game contents and/or indicates attributes of the corresponding game contents. In an embodiment of the present invention, "parameters" of game contents may be stored in the game content parameter storage unit 53. The game content parameter storage unit 53 may be implemented by a game content parameter management table provided on, for example, an external memory 15 or an external database server. The game content parameter management table may store various information that characterizes the corresponding game contents and/or indicates attributes of the corresponding game contents in association with game content identification information that identifies the corresponding game contents. FIG. 5 shows an example of game content parameter management table stored on a game content parameter storage unit 53.

As shown in FIG. 5, the game content parameter management table in an embodiment of the present invention may store various parameters such as rarity value, offensive power, and defensive power assigned to game contents, the names of the game contents, and game content images representing the game contents, in association with the game content identification information of the corresponding game content. Parameters of a game content are not limited to those explicitly shown in FIG. 5. Parameters of a game content may include various information indicating characteristics, natures, values, types, etc. of the game content. The game content parameter management table in FIG. 5 shows "rarity value," "offensive power," "defensive power," and "mobility" as examples of game content parameters.

The "rarity value" of a game content is an indicator that may indicate how rarely the game content can be obtained. This indicator may have a value ranging from "1" to "4" in the example shown in FIG. 5. The game provided by the server device 10 may also be designed such that game contents having a lower rarity value can be obtained more frequently and game contents having a higher rarity value can be obtained less frequently. In an embodiment, when receiving an acquisition request for a game content from a terminal device of a player, the server device 10 may select a game content to be provided to the terminal device 30 in accordance with a predetermined lottery algorithm. The rarity value may be referred to as required in a lottery of a game content to be provided to the terminal device 30.

FIG. 5 shows "offensive power," "defensive power," and "mobility" in addition to "rarity value," as examples of parameters of a game content. These parameters may be referred to as required in, for example, a battle with a character of another player or a non-player character. In a video game provided by the server device 10, battles between player characters and between a player character and a non-player character may be performed such that game contents having higher values of parameters such as "offensive power," "defensive power," and "mobility" are more likely to win. In an embodiment of the present invention, as shown in FIG. 5, a game content having a higher "rarity value" (e.g., a game content identified by the game content identification information "00000005") may have relatively high "offensive power," "defensive power," and/or "mobility" assigned thereto. Thus, in most cases, players can advantageously proceed a video game by using game contents having high "rarity values" (conventionally called "rare cards" among game developers and players); therefore, players may be motivated to obtain game contents having high rarity values.

The server device 10 may store various information for progression of the game and management of players, in addition to information on game contents. For example, the player specifying information storage unit 54 may store, for each player, player specifying information that specifies the player. The "player specifying information" may include any information that represents personality and characteristics of a player and specifies the player when presented to another player. In online games or social games, the personality and the characteristics of one player may be communicated to other players by generating a display image representing the one player based on the player specifying information and displaying the generated image in the game screen of said other players. The display images representing the players may express the personalities of the players, thereby encouraging interaction between the players through the game.

The player specifying information may include, for example, information set by the player to characterize the player, such as a player name or avatar. The player name may be desirably determined by the player; therefore, a plurality of players may possibly use the same player name. Accordingly, in a strict sense, a player name does not uniquely specify a player, but practically it may serve as an indicator for specifying a player because the number of players interactively playing a game is limited in terms of time. Therefore, a player name may be herein included in player specifying information that specifies a player. An avatar may also be included in player specifying information for the same reason. That is, many players may play games using avatars having distinctive appearance to express their personalities. To support such needs of players, various items for decorating avatars have been provided as a function of games or a platform of games. Accordingly, an avatar cannot always uniquely specify a player but practically serves for specifying a player because the player may try to personalize the avatar.

The player specifying information storage unit 54 may be implemented by a player specifying information table provided on, for example, an external memory 15 or an external database server. FIG. 6 shows an example of a player specifying information table according to an embodiment of the present invention. As shown, the player specifying information table according to an embodiment of the present invention may store various player specifying information such as player names and avatars in association with player identification information of each player. Avatars may be stored as, for example, images in JPEG format on the server device 10; the player specifying information management table may store URLs indicating the location where the images are stored.

The player specifying information may include various information occurring in progression of games, in addition to information desirably set by players such as user names and avatars. For example, the player specifying information may include a trade ID (described later) generated based on an exhibition request, because a trade ID may uniquely specify an exhibitor player. Also, the player specifying information may include player identification information that specifies a player.

The exhibition request obtaining unit 55 may obtain an exhibition request from a terminal device 30 operated by players of the video game provided by the server device 10, the exhibition request being made to exhibit a game content owned by the player.

As will be described later, players may exchange game contents when it is determined that the exchange is concluded based on an exchange request for exchange of the above exhibited game content for a game content owned by another player.

The method of exchanging game contents between players in a video game provided by the server device 10 will now be described in more detail. When a certain player is to exchange a certain game content for another game content owned by another player, the certain player operates a terminal device 30 performing the game function to send an exhibition request to the server device 10 so as to exchange the player's own game content for the game content of the other player. The exhibition request may include various information such as the player identification information of the player making an exhibition request (hereinafter also referred to as "an exhibitor player"), the game content identification information of the game content to be exhibited by the exhibitor player for exchange (herein also referred to as "an exhibited game content"), exhibited number, and desired conditions for a desired game content to be obtained from another player in exchange for the exhibited game content.

For example, the player identified by the player identification information "000001" (hereinafter "player 1") may exhibit a game content identified by the game content identification information "00000125" (hereinafter "game content 125") among his own game contents (see FIG. 4) for exchange for another game content. In this case, player 1 can generate an exhibition request for exhibition of the game content 125 and send the generated exhibition request to the server device 10 through operation of a user interface provided by the terminal device 30. The exhibition request may include, for example, the player identification information "000001" of player 1 (an exhibitor player) and the game content identification information "00000125" of the exhibited game content. When player 1 owns a plurality of game contents 125, the exhibition request may include the quantity to be exhibited as exhibited quantity. The exhibited quantity may be equal to or less than the owned quantity of the game content 125 stored in the table shown in FIG. 4. Also, the exhibition request may include desired conditions for the desired game content. The desired conditions for desired game contents may include, for example, at least part of various information representing the type and quantity of the game contents, attributes of the game contents such as offensive power, and attributes of game contents such as desired amount of virtual currency. In an embodiment, desired conditions may be freely inputted by an exhibitor player. For example, if the desired conditions include the number of desired game contents, the exhibitor player can input a desired number through the input interface of the terminal device 30. In another embodiment, the desired conditions are selected from a limited number of options presented by the game. For example, when the desired conditions include the number of desired game contents, 10-increment options ranging from 10 to 200 such as "10," "20," . . . "200" may be presented, and the exhibitor player may select one close to the desired condition from the limited number of options.

The exhibition request sent from the terminal device 30 may be received by the server device 10 and then obtained by the exhibition request obtaining unit 55. In an embodiment, the exhibition request obtaining unit 55 obtains the exhibition request and generates a trade ID unique to the exhibition request, and the exhibition request management table may store at least part of the information included in the exhibition request in association with the trade ID. FIG. 7 shows an example of the exhibition request management table according to an embodiment of the present invention.

As shown in FIG. 7, the exhibition request management table according to an embodiment of the present invention may store player identification information of an exhibitor player, game content identification information of an exhibited game content, the exhibited number of exhibited game contents, one or more desired conditions, and an exhibition period representing the duration of the exhibition, for each exhibition request obtained by the exhibition request obtaining unit 55. Additionally, when an exchange request (described later) is obtained by the server device 10, the exhibition request management table may store the game content identification information of a bid game content included in the exchange request. In the example shown in FIG. 7, when an exhibition request is received from player 1, the trade ID "A000001" may be generated and stored in association with information representing the player identification information "000001" of player 1, the game content identification information "00000125" included in the received exhibition request, the desired conditions "MS12" and "001," and the exhibition termination time "April 9 9:00" at which the exhibition of the exhibited game content will be terminated, and the game content identification information "00000131" of the bid game content included in an exchange request from another player for the exhibition request. For example, the exhibition termination time may be set to 24 hours after the exhibition request is obtained from the exhibitor player.

As stated above, an exhibition request may include various conditions of desired game contents set by the exhibitor player as desired conditions. In the example shown in FIG. 7, Condition 1 is set to "ITEM53" representing the type of the desired game content, and Condition 2 is set to "131" representing the number of the desired game contents. That is, the exhibition request identified by the trade ID "A000003" indicates that player 4 identified by the player identification information "000004" wants to obtain 131 game contents of the type identified by "ITEM53." The setting of desired conditions is optional, and desired conditions may not be set. For example, the trade ID "A000004" is an example of a record created based on an exhibition request in which desired conditions are not inputted by the exhibitor player, and thus it contains no data representing the desired conditions in the columns Desired Condition 1 and Desired Condition 2.

Additionally, an exhibition request may include a plurality of game content identification information. For example, player 1 may input a plurality of game content identification information into one exhibition request, thereby to exhibit game contents identified by the plurality of game content identification information as a set. When an exhibition request includes a plurality of game content identification information, the plurality of game content identification information may be stored in association with one trade ID. For example, when an exhibition request from player 1 includes game content identification information "00000130" in addition to game content identification information "00000125," both game content identification information "00000130" and game content identification information "00000125" may be stored in the exhibition request management table in association with the trade ID "A000001."

The content of the exhibition request obtained from player 1 may be opened to other players by the server device 10. More specifically, the exhibition data generating/sending unit 56 may generate exhibition data based on the exhibition request obtained from player 1 and provides the generated exhibition data to the terminal devices 30 of other players. Other players can determine whether to make an exchange request (or a bid) for the exhibited game content, based on the content of the exhibition data provided to their terminal devices 30. In an embodiment, the exhibition data generating/sending unit 56 may generate exhibition data including game content information on the exhibited game content The "game content information" related to a game content may include an image representing the game content, the name of the game content, and various information representing the content of the exhibited game content such as the level and offensive power assigned to the game content. The game content information is not limited to those explicitly described herein but may include various information representing characteristics and attributes of the game content. Meanwhile, the exhibition data may be generated so as not to include the exhibitor player specifying information, thereby to restrain real money trade. Alternatively, even if exhibition data includes exhibitor player specifying information, the exhibition data may include the exhibitor player specifying information such that the exhibitor player specifying information cannot be perceived by the player. Herein, if it is described that exhibition data does not include player specifying information, the exhibition data does not include the player specifying information in such a manner that the player specifying information can be perceived by a player through, e.g., the display function of the terminal device 30. Accordingly, even if the exhibition data includes information corresponding to the player specifying information, the player specifying information may be regarded as not being included in the exhibition data on the condition that, for example, the player specifying information is encrypted with an algorithm that cannot be decrypted by the terminal device 30.

The exhibition data generating/sending unit 56 can generate exhibition data with reference to, for example, the exhibition request management table shown in FIG. 7. For example, when the exhibition data generating/sending unit 56 generates exhibition data based on the exhibition request identified by the trade ID "A000001" stored in the exhibition request management table shown in FIG. 7, the generated exhibition data related to the trade ID "A000001" may include an image representing the exhibited game content identified by the game content identification information "00000125" associated with the trade ID "A000001," game content information such as parameters assigned to the exhibited game contents, and the game content identification information "00000125." Also, the exhibition data may include an encrypted trade ID "A000001" encrypted with a method prohibiting decryption by the terminal device 30. The image representing the exhibited game content and the parameters assigned to the exhibited game content may be obtained from the game content parameter management table shown in FIG. 5. In an embodiment, the exhibition data may be generated so as not to include the player specifying information of player 1 who is the exhibitor, for the purpose of restraining real money trade.

The exhibition data generating/sending unit 56 may send the generated exhibition data to the terminal devices 30 of other players. For example, the exhibition data generating/sending unit 56 may generate a web page including the exhibition data (hereinafter "exhibited-game content page") as a part of the web pages constituting the game site and send the generated web page (that is, HTML data corresponding to the web page) to the terminal device 30. The exhibited-game content page may include a plurality of exhibition data generated based on a plurality of exhibited game contents. The exhibited-game content page will be described later in relation to FIG. 9.

The player may obtain the exhibited-game content page from the server device 10 and view, on the terminal device 30, the information on the exhibited game content (the image and parameters, etc.) included in the exhibited-game content page, through operation of the terminal device 30. Then, the player may send to the server device 10 an exchange request for exchanging his own game content for the exhibited game content viewed. Herein, the image displayed on the terminal device 30 based on the exhibited-game content page may be referred to as "an exhibited-game content image"; and the player who sends an exchange request based on the exhibited-game content image may be referred to as "a bidder player." An exchange request may include: game content identification information identifying the exhibited game content included in the exhibited-game content page; game content identification information identifying the game content to be exchanged owned by the bidder player (herein also referred to as "a bid game content"); and an encrypted trade ID included in the exhibition data. An exchange request may include player identification information of the bidder player, in addition to the above information. For example, when the player identified by the player identification information "000005" (hereinafter "player 5") wants to exchange his own game content identified by the game content identification information "00000005" (hereinafter "game content 5") for the exhibited game content included in the exhibited-game content page (e.g., the game content 125 of player 1), the exchange request may include the game content identification information "00000125" identifying the game content 125 being the exhibited game content, the game content identification information "00000005" of the game content to be exchanged, and the player identification information "000005" of player 5. Further, when a plurality of game contents are provided in exchange of the exhibited game content, the exchange request may include the provided number of the bid game contents to be provided by the bidder player. For example, when three game contents 5 are to be provided, the exchange request may include the number "3" of the game contents to be provided by the bidder player. Such an exchange request may be generated by the function of software implemented on the terminal device 30 when, for example, the player selects an operation button contained in the exhibited-game content page. The exchange request thus generated may be sent to the server device 10 through the function of web browser on the terminal device 30.

The server device 10 may receive the exchange request sent from the terminal device 30. The received exchange request may be obtained by the exchange request obtaining unit 57. The server device 10 may include an exhibition request management table updating unit (not shown) for updating the exhibited request management table shown in FIG. 7 based on the exchange request. The exhibition request management table updating unit may extract the game content identification information of the bid game content and the encrypted trade ID included in the obtained exchange request, and decrypt the encrypted trade ID to obtain the trade ID. Then, the exhibition request management table stores, in association with the trade ID, the game content identification information of the bid game content extracted from the exchange request. The exhibition request management table updating unit may extract, for example, the game content identification information of the exhibited game content from the exchange request obtained by the exchange request obtaining unit 57, and specify, with reference to the exhibition request management table shown in FIG. 7, the exhibition request in which the game content corresponding to the game content identification information is exhibited. Further, the game content identification information of the bid game content included in the exchange request may be stored in association with the game content identification information of the exhibited game content, thereby to update the exhibition request management table.

When the exchange request obtaining unit 57 obtains the exchange request from the bidder player, the determination unit 58 may determine whether the exchange of the exhibited game content and the bid game content is concluded based on the exchange request in accordance with the predetermined determination logic. In an embodiment, the determination unit 58 may extract, from the exchange request obtained by the exchange request obtaining unit 57, the game content identification information identifying the exhibited game content and the game content identification information identifying the bid game content, and obtain game content parameter values stored in association with the extracted game content identification information from the game content parameter management table shown in FIG. 5. In an embodiment, the determination unit 58 may determine whether the exchange of the exhibited game content and the bid game content is concluded based on thus obtained game content parameter values of the exhibited game content and the game content parameter values of the bid game content. The game content parameter values used for determination by the determination unit 58 may include various parameter values in addition to game content parameter values stored in the game content parameter management table shown in FIG. 5 (i.e., "rarity value," "offensive power," and "defensive power").

By way of an example, a process wherein the determination unit 58 determines whether an exchange is concluded based on the rarity value will now be described, based on the case where, as described above, player 1 exhibits the game content 125 as an exhibited game content and player 5 sends to the server device 10 an exchange request for exchanging the game content 5 for the game content 125. In this case, the determination unit 58 may obtain the rarity value "1" stored in association with the game content 125 and the rarity value "4" stored in association with the game content 5, both stored in the game content parameter management table shown in FIG. 5. Then, the determination unit 58 may subtract the rarity value "1" of the game content 125 from the rarity value "4" of the game content 5 to obtain the difference "3" therebetween. Next, the determination unit 58 may compare the obtained difference (or its absolute value) between the rarity value of the game content 5 and the rarity value of the game content 125 with a predetermined threshold value, and determines, in accordance with the result of this comparison, whether the exchange of the game content 5 and the game content 125 is concluded. When the threshold value is set to "2" for example, the determination unit 58 may compare the obtained difference or its absolute value "3" between rarity values of the game contents to be exchanged with the threshold value, and determine that, for example, the exchange of these game contents is concluded when the difference between rarity values of the game contents to be exchanged is equal to or less than the threshold value, and that the exchange of these game contents is not concluded when the difference between rarity values of the game contents to be exchanged is greater than the threshold value. The threshold value and the comparing algorithm may be desirably determined in accordance with game operation policy of a game producer or a game provider.

The determination unit 58 may perform determination based on any game content parameters, as well as rarity values mentioned above. For example, it may compare parameter values such as "offensive power," "defensive power," "mobility," etc. assigned to each of game contents required to be exchanged, thereby to determine whether the exchange of these game contents is concluded.

The determination algorithm used in the determination unit 58 may be set so as to determine that an exchange of game contents is concluded when, for example, the difference in value between an exhibited game content and a bid game content required to be exchanged by an exchange request obtained from the terminal device 30 lies within a predetermined range.

By way of one example, such determination algorithm uses rarity values, as described above. That is, rarity values assigned to game contents represents the difficulty of obtaining the game contents; therefore, when the difference between the rarity value of the exhibited game content and the rarity value of the bid game content is less than a predetermined threshold value, it means that the difference in value between these game contents lies within a range designated by the threshold value.

The determination algorithms explicitly described herein are mere typical examples that facilitate understanding of the invention. Any determination algorithm is applicable to the present invention as long as it determines whether the difference in value between the exhibited game content and the bid game content required to be exchanged lies within a predetermined range. For example, the determination algorithm may compare the exhibited number of the exhibited game contents with the bid number of the bid game contents, and determine that an exchange of the exhibited game contents and the bid game contents is concluded when the difference between the exhibited number and the bid number is smaller than a predetermined threshold value. The exhibited number of the exhibited game contents may be included, for example, in an exhibition request sent from the terminal device 30 of the exhibitor player or an exchange request sent from the terminal device 30 of the bidder player. Also, the bid number of bid game contents may be included in an exchange request from the terminal device 30 of the bidder player.

In a typical example of real money trade, players agree on exchange of game contents outside the game, and exchange the game contents by using an exchange function implemented in the game to perform the agreement. In many cases, the player who takes a game content having high value may provide money to the player who gives the game content outside the game. For example, when player A agrees to give his own rare card to player B in exchange of a certain amount of money, player B exhibits his own unnecessary card in the game, and then player A submits an exchange request for exchange of the rare card to be given for the exhibited card. Thus, the owner of the rare card in the game is changed from player A to player B. As clearly shown by this example, the values of game contents exchanged in the game for a real money trade are often unbalanced. This is because money is provided outside the game, as described above. Therefore, the determination unit 58 may determine that an exchange of an exhibited game content and a bid game content required to be exchanged is concluded only when the difference in value between these game contents lies within a predetermined range (otherwise, the exchange is not concluded), so as to prevent an exchange of game contents having largely different values. Thus, real money trade can be effectively restrained.

In addition to the above determination algorithms, various algorithms may be used for the determination unit 58 to determine whether an exchange is concluded. For example, the determination algorithm may determine that an exchange of exhibited game contents and bid game contents required to be exchanged is concluded only when the difference between the provided number of the exhibited game contents and the provided number of the bid game contents is smaller than a predetermined threshold value of provided number (otherwise, the exchange is not concluded). Such determination algorithm may prevent a trade wherein the difference between the provided numbers is larger than a predetermined amount from being concluded. Also, when the provided number of the exhibited game contents and the provided number of the bid game contents are largely different, it may be presumed that money is given outside the game; therefore, a trade wherein the difference between the provided numbers is larger than a predetermined amount may be prevented to restrain real money trade.

Further, the determination algorithm used by the determination unit 58 may determine that an exchange of exhibited game contents and bid game contents required to be exchanged by an exchange request is not concluded when one or both of the exhibited game contents and the bid game contents have a certain parameter value (hereinafter "trade-forbidden parameter value"). In other words, this determination algorithm determines that the exchange of the exhibited game contents and the bid game contents is concluded only when none of the exhibited game contents and the bid game contents has a trade-forbidden parameter value. For example, in many cases, there is no reasonable reason that game contents that very rarely appear in the game should be exchanged for other game contents; and real money trade may possibly be involved in such an exchange. Therefore, parameter values assigned to such game contents may be designated to be trade-forbidden parameter values. For example, rarity value "4" may be designated to be a trade-forbidden parameter value. In this case, when one or both of the exhibited game contents and the bid game contents include a game content having a rarity value of "4" assigned thereto, the determination unit 58 may determine that the exchange is not concluded. The server device 10 may include a management table for managing the trade-forbidden parameter values. Based on this table, trades of game contents having trade-forbidden parameter values can be uniformly determined not to be concluded. Further, the determination algorithm used by the determination unit 58 may determine that an exchange of exhibited game contents and bid game contents required to be exchanged by an exchange request is not concluded when one or both of a parameter value of the exhibited game contents and the provided number of the exhibited game contents and one or both of a parameter value of the bid game contents and the provided number of the bid game contents make a combination for which a trade is forbidden (hereinafter "trade-forbidden pair"). The server device 10 may include, for example, a trade-forbidden pair management table (not shown) to manage combinations of parameter values and/or provided number of exhibition game contents and parameter values and/or provided number of bid game contents, for which a trade is forbidden. The determination unit 58 may determine whether an exchange of the exhibition game contents and the bid game contents required to be exchanged by an exchange request is concluded, with reference to the trade-forbidden pair management table. By way of an example, a trade-forbidden pair stored in the trade-forbidden pair management table may include a rarity value "2" of the exhibited game contents and the provided number "500" of the bid game contents.

When the determination unit 58 determines that an exchange of the exhibited game contents and the bid game contents included in an exchange request is concluded, the process of exchanging the exhibited game contents and the bid game contents may be performed as follows. When the determination unit 58 determines that the exchange is concluded, the bid data generating unit 59 may generate bid data based on the exchange request obtained from the bidder player. The bid data may include game content information on the bid game contents and an encrypted trade ID extracted from the obtained exchange request. More specifically, the bid data generating unit 59 may extract game content identification information of the bid game contents included in the exchange request, and obtain parameters such as a name and image corresponding to the game content identification information from the game content parameter management table shown in FIG. 5, thereby to generate the bid data that includes the parameters. As already described for exhibition data, game content information may include various information representing the characteristics of the game content such as an image associated with the game content, the name of the game content, and parameters of the game content such as level and offensive power. In an embodiment, the bid data generating unit 59 generates bid data that does not include player specifying information of the bidder player.

The bid data sending unit 60 may generate a web page including the generated bid data (hereinafter "bid information viewing page") as a part of web pages constituting the game site, and send the generated bid information viewing page (actually, HTML data corresponding to the web page) to the terminal device 30 of the exhibitor player.

The exhibitor player may obtain the bid information viewing page from the server device 10 and view the bid information viewing page on the terminal device 30 through operation thereof. Herein, an image displayed on the terminal device 30 based on the bid information viewing page may be referred to as "a bid game content image." The exhibitor player may compare the bid game content displayed in the bid information viewing page with his own exhibited game content and determine whether to confirm the exchange. When the exhibitor player confirms the exchange through operation of the terminal device 30, an exchange confirmation request may be generated through the function of the terminal device 30 and sent to the server device 10. The exchange confirmation request may include game content identification information and an encrypted trade ID for each of the game contents (the bid game content and the exhibited game content) to be exchanged.

The exchange confirmation request may be received by the server device 10. The updating unit 61 may update the owned game content management table shown in FIG. 4 based on the exchange confirmation request obtained from the terminal device 30 of the exhibitor player. More specifically, the updating unit 61 specifies the exhibited game content and the bid game content that are exchanged, based on the exchange confirmation request (e.g., based on the encrypted trade ID included in the exchange confirmation request), and updates the association between the exhibited game content and the player identification information and the association between the bid game content and the player identification information in the game content identification information table. For example, in the case where an exhibited game content of player 1 represented by the game content identification information "00000125" and a bid game content of player 5 represented by the game content identification information "10000031" are exchanged, the game content identification information "00000125" corresponding to the exhibited game content that is no longer owned by player 1 after the confirmation of the exchange is erased from the column of Game Content Identification Information 2 associated with the player identification information "000001" of player 1, and instead, the game content identification information "10000031" corresponding to the bid game content obtained through the exchange is written into the column. Meanwhile, the game content identification information "10000031" corresponding to the bid game content that is no longer owned by player 5 after the confirmation of the exchange is erased from the column of Game Content Identification Information 3 associated with the player identification information "000005" of player 5, and instead, the game content identification information "00000125" corresponding to the exhibited game content obtained through the exchange is written into the column.

Meanwhile, when the determination unit 58 determines that an exchange of the exhibited game contents and the bid game contents included in the obtained exchange request is not concluded, the above process of exchanging the exhibited game contents and the bid game contents is not performed. Since the determination unit 58 may determine that an exchange of exhibited game contents and bid game contents is not concluded when the difference in value between these game contents is large, real money trade wherein game contents having largely different values are exchanged can be technically restrained.

When the determination unit 58 determines that the exchange of the exhibited game contents and the bid game contents included in the exchange request is not concluded, the updating unit 61 may delete, from the owned game content management table shown in FIG. 4, the game content identification information of the bid game content stored in association with the player identification information of the bidder player. Also, the game content identification information of the bid game content stored in the exhibition request management table shown in FIG. 7 based on the exchange request may be deleted from the exhibition request management table.

In an embodiment, when the determination unit 58 determines that an exchange of exhibited game contents and bid game contents included in an obtained exchange request is not concluded, the conclusion of the exchange may be simulated in accordance with the conditions included in the exchange request, between the bidder player who has sent the exchange request and the administrator of the online game provided by the server device 10. Such simulated exchange between the bidder player and the administrator of the online game may be implemented by the updating unit 61 which may erase, from the owned game content management table shown in FIG. 4, the game content identification information corresponding to the bid game contents associated with the bidder player, and instead, write the game content identification information of the same type of game contents as the exhibited game contents obtained from the administrator of the online game. Thus, when the determination unit 58 determines that an exchange is not concluded, the bidder player cannot exchange game contents with the exhibitor player, but can obtain the same type of game contents as the exhibited game contents in exchange of the bid game contents through the processing of the updating unit 61. As described above, the bidder player can have the same result as if the bid game contents are exchanged for the exhibited game contents with the function provided by the server device 10. Herein, an exchange performed in such a manner may be referred to for convenience as an exchange between a bidder player and the administrator of the online game (or the administrator of the server device 10).

The same type of game content as an exhibited game content refers to, for example, a game content having the same name as the exhibited game content. In FIG. 5, the game content identified by the game content identification information "00000125" has a name "Machine A" assigned thereto. In an online game, a plurality of players can be provided with game contents having the same name. For example, players may battle with each other by using the same type of game contents having the same name "Machine A." Also, game contents whose display images are the same may be regarded as the same type of game contents. In many cases, the same type of game contents have the same or approximate game content parameter values assigned thereto (for example, game contents having the same name have the same rarity value). However, it should be noted that the same type of game contents may have different game content parameter values depending on the use condition of the game content in the game. In another embodiment, the game content parameter management table of FIG. 5 may store type codes designating the types of the game contents in association with the game content identification information of the game contents; and game contents having the same type code may be treated as the same type of game contents.

Following is a specific example of an exchange between a bidder player and the administrator of the online game. Supposing player 5 generates an exchange request for exchange of the bid game content identified by the game content identification information "00000005" for the exhibited game content identified by the game content identification information "00000125" exhibited by player 1, since the difference between the rarity value of the exhibited game content and the rarity value of the bid game content stored in the game content parameter management table shown in FIG. 5 is "3," the exchange based on this exchange request is not concluded, according to the above described determination algorithm. In this case, the trade requested in the exchange request may be concluded between the bidder player (player 5) and the administrator of the online game, not between the bidder player (player 5) and the exhibitor player (player 1).

When an exchange is concluded between the bidder player and the administrator of the online game, the game content identification information "00000005" corresponding to the bid game content may be deleted from the column of Game Content Identification Information 2 associated with the player identification information "000005" of the bidder player (player 5) in the owned game content management table shown in FIG. 4, the bid game content being no longer owned by the bidder player after conclusion of the exchange with the administrator of the online game; and instead, the game content identification information of the same type of game content as the exhibited game content obtained from the administrator of the online game may be written.

Thus, when the determination unit 58 determines that the exchange of the exhibited game contents and the bid game contents included in the obtained exchange request is not concluded, the exchange may be concluded between the bidder player (player 5) and the administrator of the online game, not between the bidder player (player 5) and the exhibitor player (player 1), so as to prevent real money trade, while concluding a trade substantially as desired (that meets the exchange request) at least for the bidder player.

Figure 8:
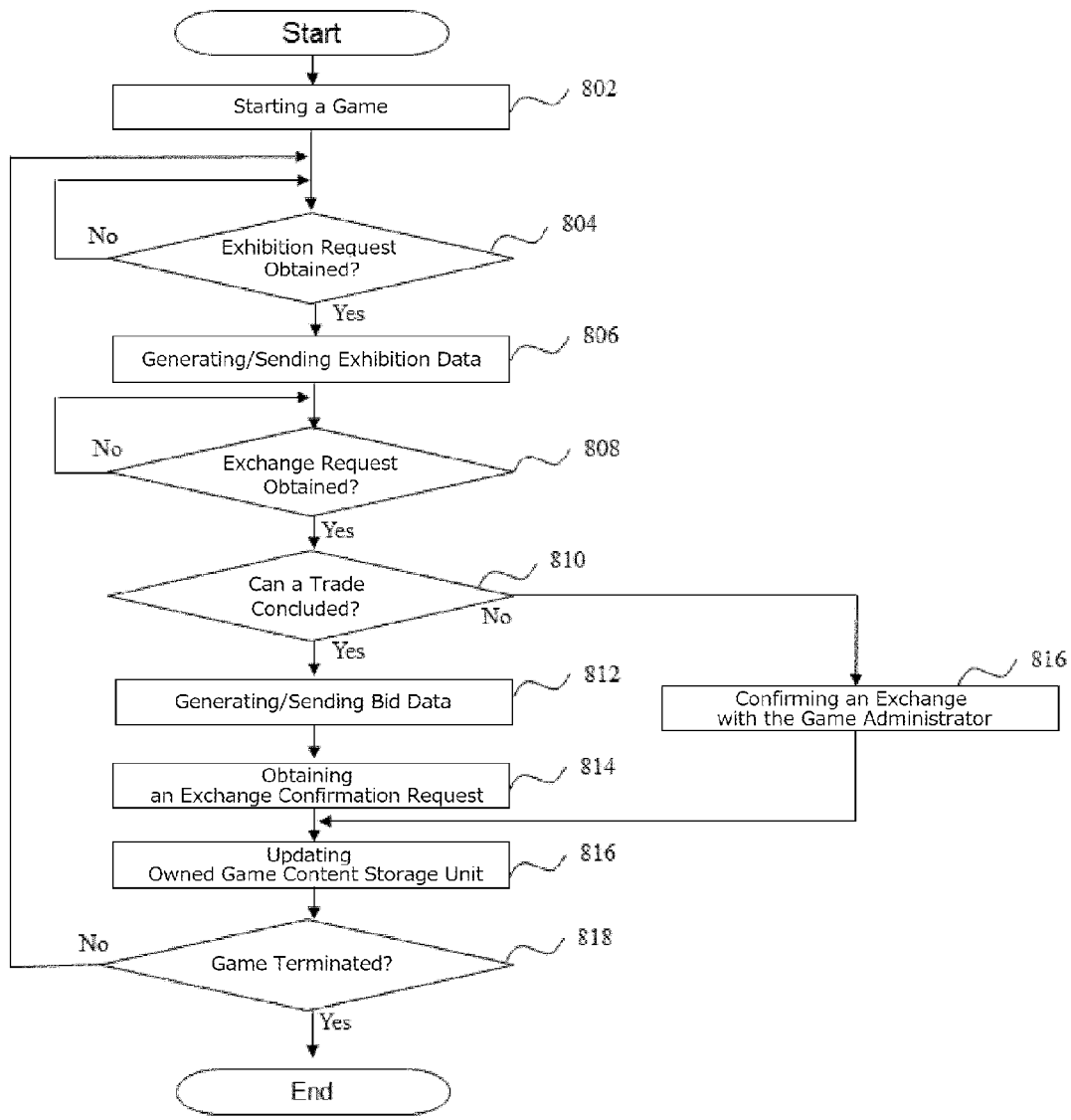
FIG. 8 is a flow diagram showing an exchange process of game contents according to an embodiment of the present invention.

Next, an example of process of exchanging game contents between players in an embodiment of the present invention will be described below with reference to FIG. 8. FIG. 8 is a flow diagram showing the outline of the processing provided by the server device 10 from the start of the game to the completion of the exchange of the game contents in accordance with the determination result of the determination unit 58. The following description is based on the case where player 5 submits an exchange request for the game contents exhibited by player 1.

First, when the game is started in step 802, player 1 may operate the terminal device 30 to access the server device 10 and acquires a web page for generating an exhibition request from a plurality of web pages constituting the game site. Player 1 may operate the user interface of the terminal device 30 to input or select, on the web page, game contents to be exhibited, the provided number thereof, and desired conditions on the desired game contents to be obtained from another player in exchange of the exhibited game contents. When player 1 selects one game content identified by the game content identification information "000000125" as an exhibited game content (with no desired condition inputted), an exhibition request including the player identification information "000001" of player 1, the game content identification information "000000125" of the exhibited game content selected by player 1, and the exhibited quantity "1" is generated and sent from the terminal device 30 to the server device 10.

Next, after the exhibition request is obtained from the terminal device 30 of player 1 in step 804, the process proceeds to step 806. In step 806, exhibition data is generated by the exhibition data generating/sending unit 56 based on the exhibition request obtained from player 1. When the terminal device 30 of player 5 requests a list of game contents being exhibited, the exhibition data generating/sending unit 56 generates an exhibited-game content page including the exhibition data of the exhibited game contents exhibited by player 1 and provides the generated exhibited-game content page to the terminal device 30 of player 5.

Figure 9:
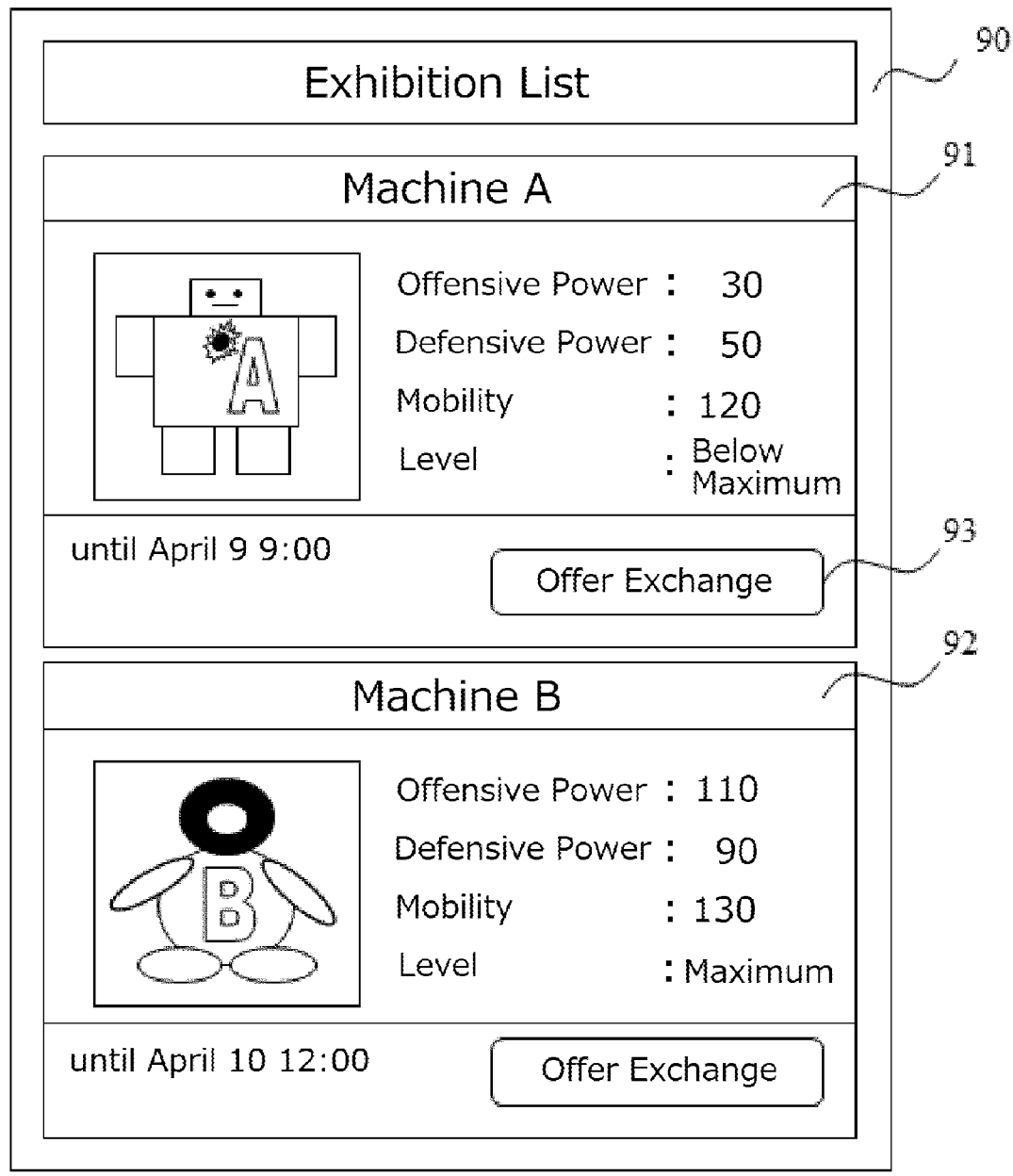
FIG. 9 shows an example of an exhibition list page in a video game system according to an embodiment of the present invention.

FIG. 9 is an example of an exhibited-game content page provided to the terminal device 30 of player 5 and displayed on the terminal device 30. The exhibited-game content page shown in FIG. 9, which contains a plurality of exhibited game contents arranged in a list, may be hereinafter referred to as "an exhibition list page." As shown in FIG. 9, the exhibition list page 90 may contain an exhibition data display image 91 and an exhibition data display image 92 representing respective exhibition data from a plurality of players. The exhibition data display image 91 may display exhibition data of a game content (game content 125) corresponding to the game content identification information "000000125" exhibited by player 1; and the exhibition data display image 92 may display exhibition data of a game content exhibited by another player. As shown, the exhibited data display image 91 may contain the game content information (including the name "Machine A" and an image) stored in the game content parameter management table shown in FIG. 5 in association with the game content 125. The exhibition list page may display, in a list, all of the exhibited game contents stored in the game content parameter management table or display only the result narrowed down therefrom with a search condition, etc.

Figure 10:
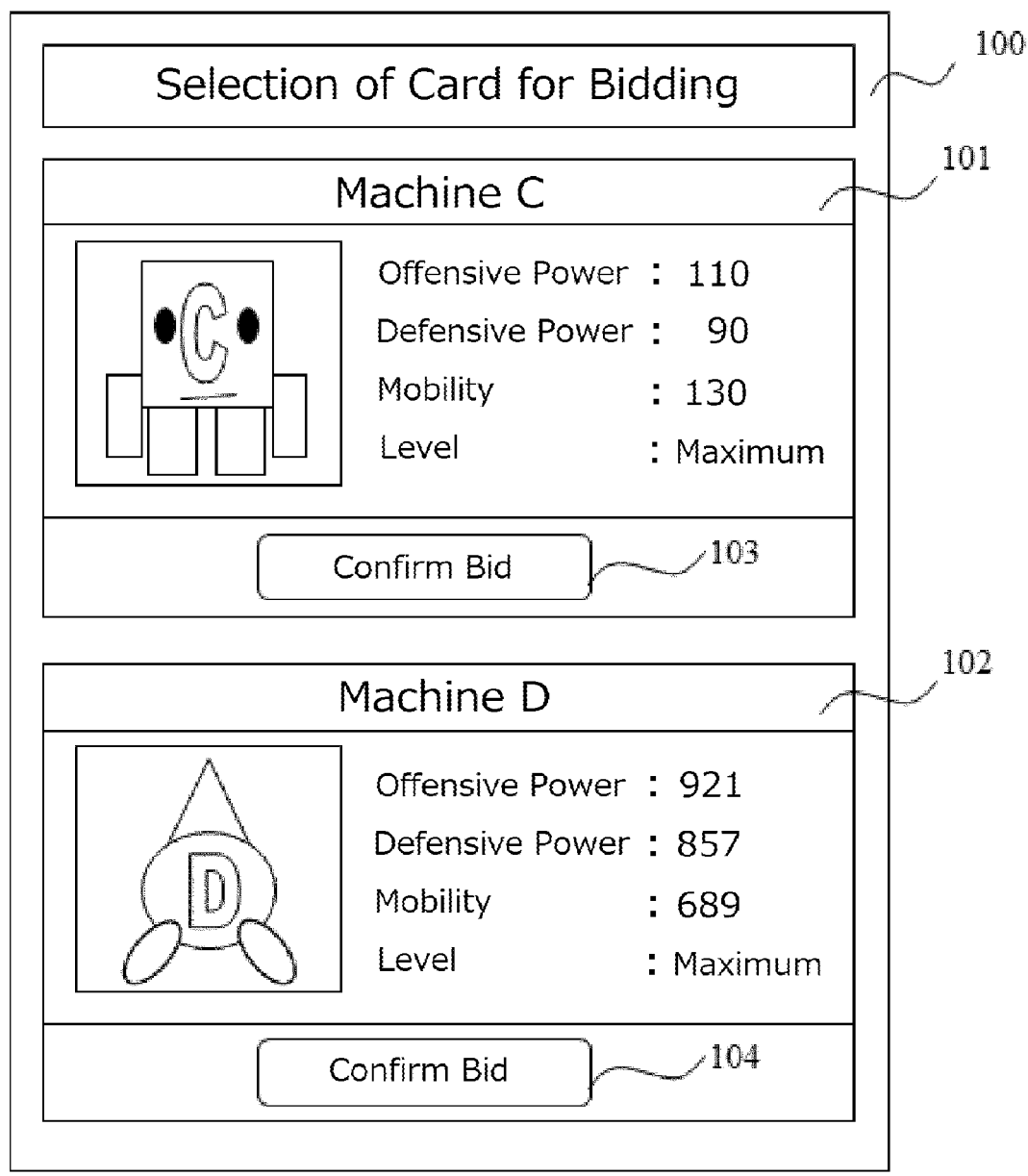
FIG. 10 shows an example of a bid game content-selecting web page in a video game system according to an embodiment of the present invention.

Player 5 may operate the terminal device 30 to select a desired game content from the exhibited game contents displayed in the exhibition list page shown in FIG. 9 and generate an exchange request for exchange of his own game content for the selected game content. For example, when the player operates the operation button 93 labeled "Offer Exchange" and displayed as part of the exhibition data display image 91, the server device 10 provides a bid game content-selecting web page for selecting a bid game content to the terminal device 30 of player 5. FIG. 10 shows an example of a bid game content-selecting web page 100 in a game system according to an embodiment of the present invention. As shown in the owned game content management table in FIG. 4, player 5 owns the game content corresponding to the game content identification information "10000031" and the game content corresponding to the game content identification information "00000005"; therefore, the bid game content-selecting web page 100 may display the game content display image 101 corresponding to the game content identification information "10000031" and the game content display image 102 corresponding to the game content identification information "00000005." The game content display images 101 and 102 may include operation buttons 103 and 104 labeled "Confirm Bid," respectively. When player 5 operates the operation button 103, an exchange request is generated through the game programs and the function of the terminal device 30; this exchange request includes the game content identification information "10000031" of Machine C associated with the operation button 103 and the game content identification information "000000125" of the exhibited game content to be exchanged therefor. Alternatively, when player 5 operates the operation button 104, an exchange request may be generated that includes the game content identification information "00000005" of Machine D associated with the operation button 104 and the game content identification information "000000125" of the exhibited game content to be exchanged therefor. The exchange request thus generated may be sent to the server device 10 from the terminal device 30.

Next, in step 808, the exchange request obtaining unit 57 of the server device 10 may obtain an exchange request sent from the terminal device 30 of player 5; and the process proceeds to step 810. In step 810, the determination unit 58 determines, based on the exchange request obtained by the exchange request obtaining unit 57, whether an exchange of the exhibited game content and the bid game content specified by the exchange request is concluded. When the operation button 103 is operated to generate an exchange request, the exchange request may include the game content identification information "000000125" identifying the exhibited game content and the game content identification information "10000031" identifying the bid game content. The determination unit 58 may read out rarity values corresponding to these game content identification information from the game content parameter management table shown in FIG. 5 and compare the difference between the rarity values with a predetermined threshold value (herein set to "3"). In this case, both rarity values are set to "1," and thus the difference therebetween is "0." Since this difference is smaller than the predetermined threshold value, the determination unit 58 may determine that the trade is concluded; and the process proceeds to step 812.

In step 812, the bid data generating unit 59 may generate bid data regarding the game content (bid game content) identified by the game content identification information "10000031" included in the exchange request obtained from the terminal device 30 of player 5. Player 1, the exhibitor player, can select an operation button or a link (neither shown) labeled "Check Exhibited Cards" displayed in the game screen, thereby to request the server device 10 to display bid data. In response to this request for displaying bid data, the bid data sending unit 60 may generate a bid information viewing page containing bid data as part of web pages constituting the game site and send the bid information viewing page to the terminal device 30 of player 1.

Figure 11:
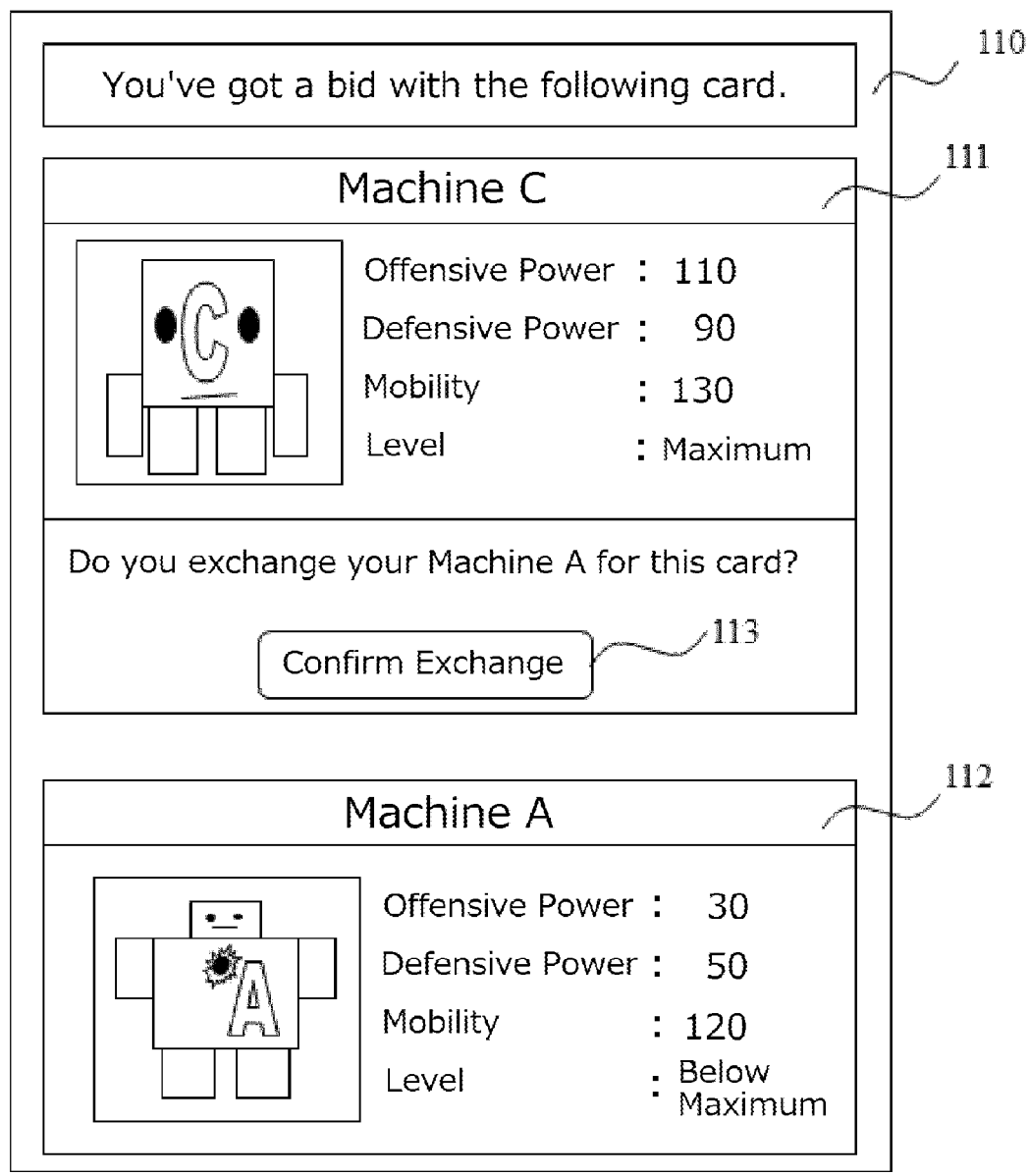
FIG. 11 shows an example of a bid information viewing page in a video game system according to an embodiment of the present invention.

FIG. 11 is an example of a bid information viewing page displayed on the terminal device 30 of player 1. As shown, the bid information viewing page 120 may contain the bid game content display image 111 representing the bid game content selected by player 5 (the game content named "Machine C" and identified by the game content identification information "10000031") and the exhibition data display image 112 representing the exhibited game content exhibited by player 1. Player 1 can grasp from the bid information viewing page 110 that another player has offered exchanging of the exhibited game content represented by the exhibition data display image 112 and the game content represented by the bid game content display image 111. When player 1 selects the operation button 113 displayed as part of the bid game content display image 111, an exchange confirmation request for confirming an exchange of the bid game content corresponding to the bid game content display image 111 and the exhibited game content corresponding to the exhibition data display image 112 may be generated and sent to the server device 10. The exchange confirmation request may include the game content identification information "10000031" of the bid game content corresponding to the bid game content display image 111 and the game content identification information "000000125" of the exhibited game content corresponding to the exhibition data display image 112.

This exchange confirmation request may be received and obtained by the server device 10 in step 814.

Next, in step 816, the owned game content management table may be updated based on the obtained exchange confirmation request. The obtained exchange confirmation request may include the game content identification information "000000125" indicating the exhibited game content and the game content identification information "10000031" indicating the bid game content, the game content identification information "00000125" corresponding to the exhibited game content no longer owned after the confirmation of the exchange is deleted from the column of Game Content Identification Information 2 associated with the player identification information "000001" of player 1; and instead, the game content identification information "10000031" corresponding to the bid game content obtained through the exchange is written. Also, the game content identification information "00000031" corresponding to the bid game content no longer owned after the confirmation of the exchange is deleted from the column of Game Content Identification Information 3 associated with the player identification information "000005" of player 5; and instead, the game content identification information "00000125" corresponding to the exhibited game content obtained through the exchange is written. Thus, when it is determined in step 810 that the exchange is concluded, the exchange of the exhibited game content and the bid game content specified by the exchange request is performed as described above.

Meanwhile, when player 5 operates the operation button 104 in the bid game content-selecting web page 100 shown in FIG. 10 to specify the game content corresponding to the game content display image 102 as a bid game content, an exchange request may be generated that includes the game content identification information "000000125" identifying the exhibited game content and the game content identification information "00000005" identifying the bid game content. When the server device 10 obtains this exchange request in step 808, the process proceeds to step 810, where rarity value "1" corresponding to the game content identification information "000000125" of the exhibited game content included in the obtained exchange request and rarity value "4" corresponding to the game content identification information "10000031" of the bid game content may be read out from the game content parameter management table shown in FIG. 5. In this case, the difference between the rarity values is "3," which is not less than the predetermined threshold value "3"; therefore, it is determined that an exchange of the game contents is not concluded between player 1 and player 5. The process proceeds to step 816.

Figure 12:
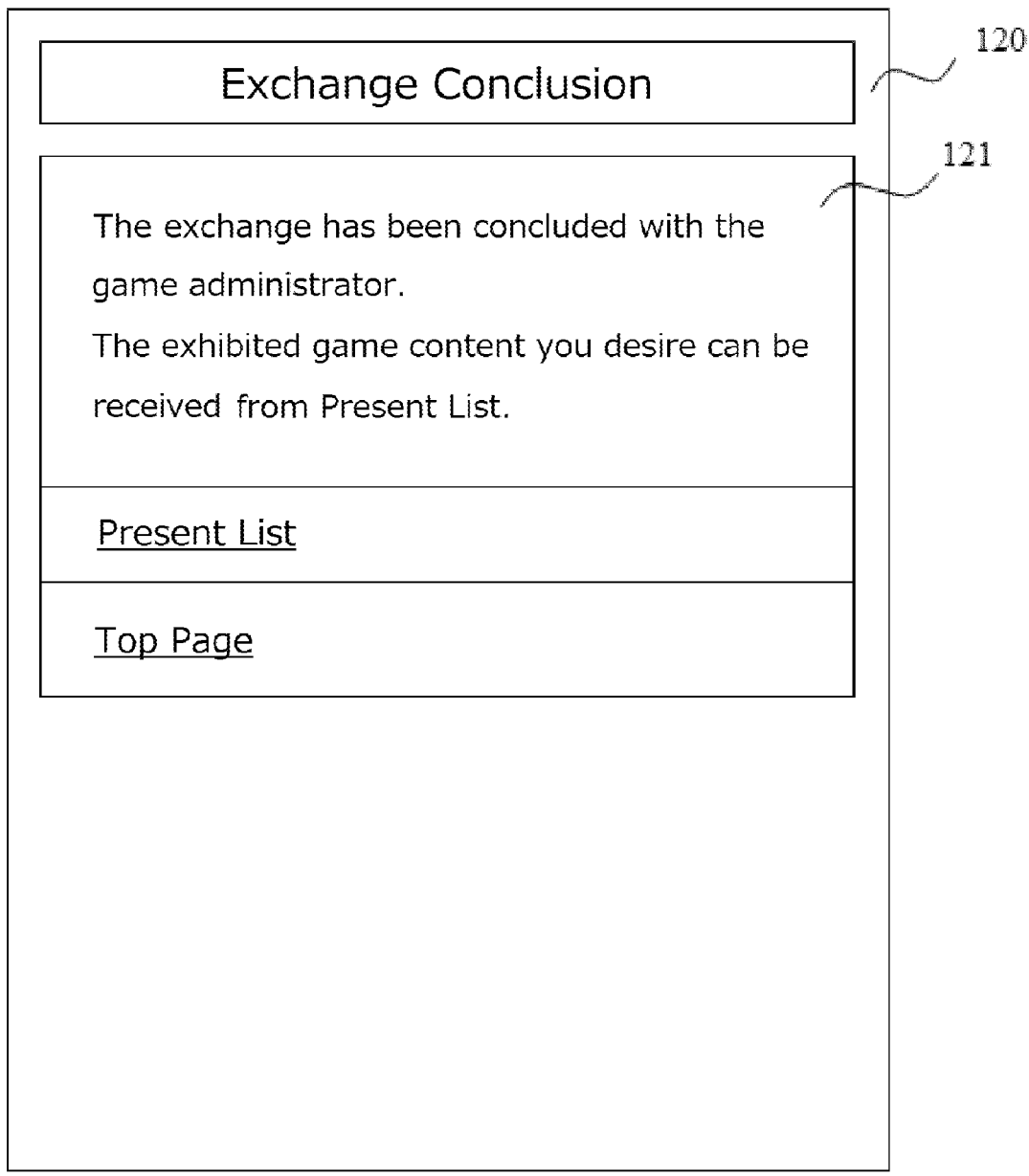
FIG. 12 shows an example of exchange conclusion-notifying web page in a game system according to another embodiment of the present invention.

In step 816, the updating unit 61 may erase, from the owned game content management table shown in FIG. 4, the game content identification information "00000005" corresponding to the bid game content associated with the player identification information "000005" of the bidder player (player 5). Also, the server device 10 may provide an exchange conclusion-notifying web page notifying to the terminal device 30 of player 5 that an exchange has been concluded with an online game administrator. FIG. 12 is an example of the exchange conclusion-notifying web page. The web page 120 shown in FIG. 12 includes a notification 121 for notifying that an exchange of the exhibited game content and the bid game content specified by the exchange request sent from player 5 has been concluded with an administrator of the online game. The web page 121 also includes a hyperlink labeled "Move to Present List."

Figure 13:
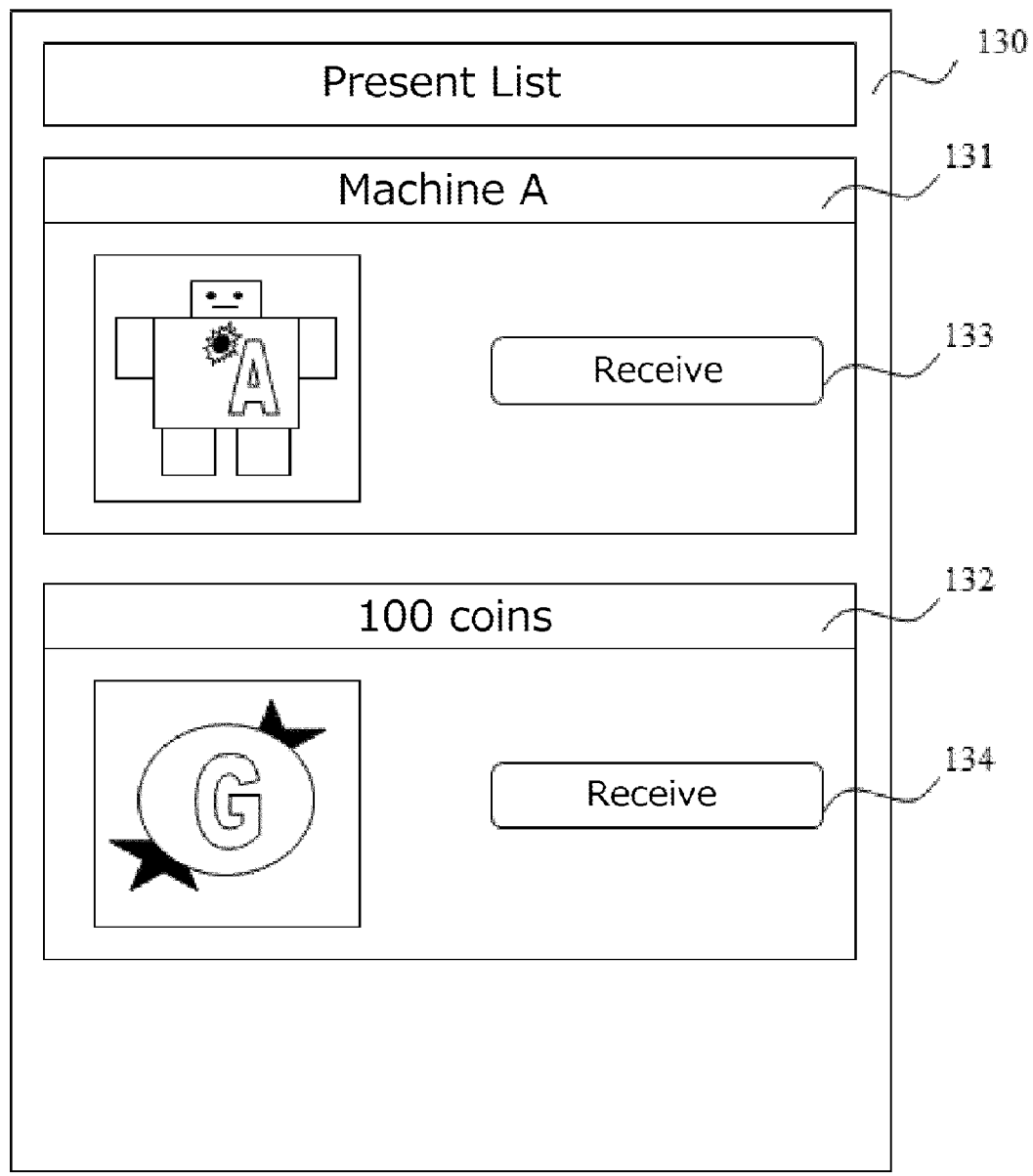
FIG. 13 shows an example of a present page in a video game system according to an embodiment of the present invention.

When player 5 operates the interface of the terminal device 30 to select the hyperlink, the present page 130 shown in FIG. 13 may be sent from the server device 10 to the terminal device 30 of player 5. The present page 130 shown in FIG. 13 may display in a list the images 131 and 132 of game contents to be provided to player 5 from the server device 10. The present page 130 may include the image of the same type of game content as the exhibited game content included in the exchange request sent form player 5. In FIG. 13, the image 131 corresponds to the same type of game content as the exhibited game content.

When player 5 operates the interface of the terminal device 30 to select the operation button 133, the terminal device 30 may send to the server device 10 an acquisition request for the game content associated with the operation button 133. When the server device 10 obtains this acquisition request, the updating unit 61 may write the game content identification information of the game content associated with the operation button 133 into the owned game content management table in association with the player identification information "000005" of player 5. Also, the server device 10 may include a management table for managing the game contents exchanged by the online game administrator with bidder players; and this management table may store the game content identification information "00000005" of the bid game content obtained from player 5. It should be noted that the information on the game content owned by player 1 (the exhibitor player) stored in the owned game content management table is not updated in step 816. Thus, when it is determined in step 810 that the exchange between the players is not concluded, the exchange of the exhibited game content and the bid game content specified by the exchange request may be performed between the bidder player and the online game administrator, as described above.

Figure 14:
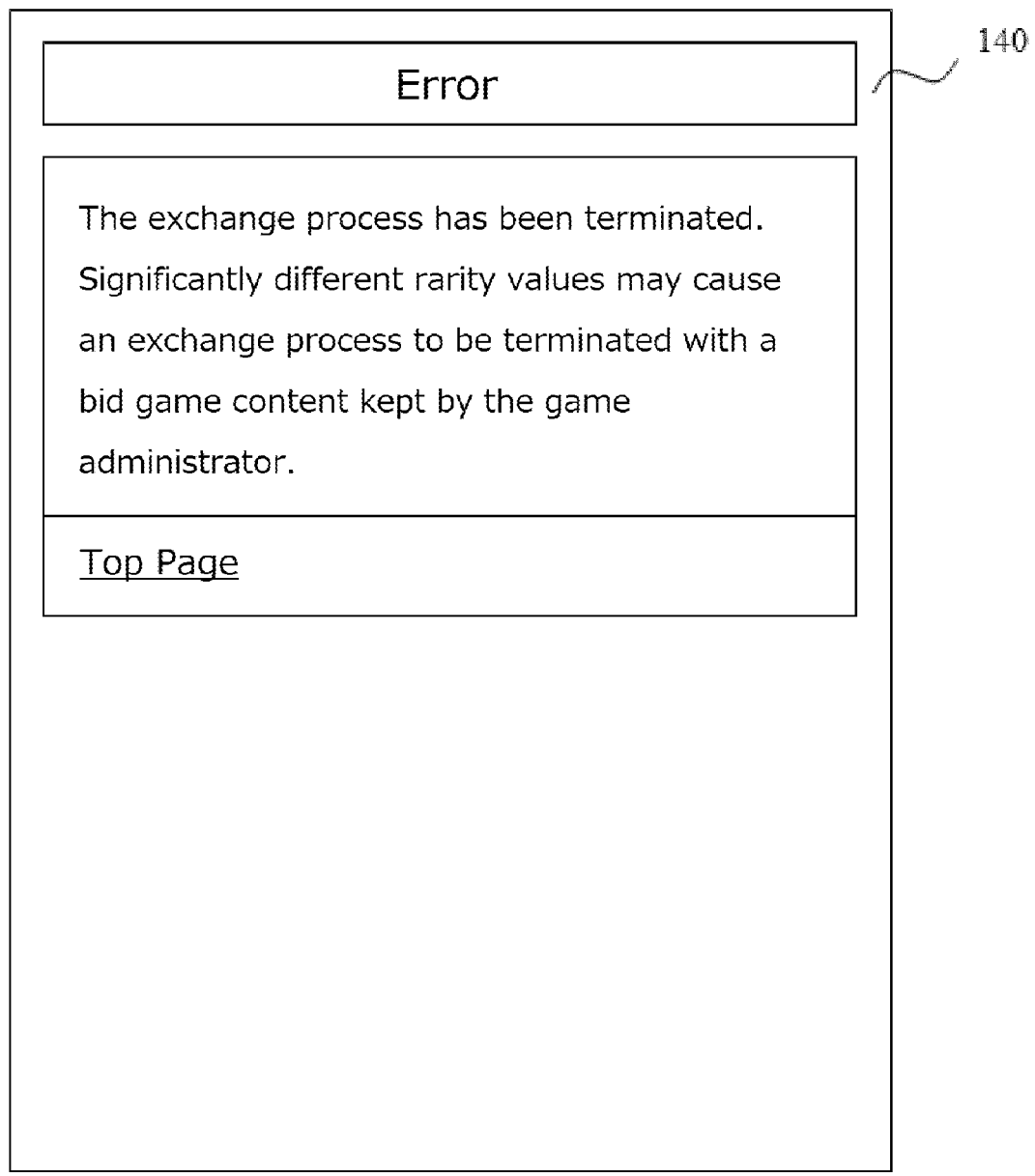
FIG. 14 shows an example of an error page displayed when it is determined that an exchange is not concluded in a video game system according to another embodiment of the present invention.

Also, when it is determined in step 810 that the exchange of the exhibited game content and the bid game content is not concluded, the exchange process may be terminated with an error page provided to the terminal device 30 of the bidder player. FIG. 14 is an example of the error page provided to the terminal device 30 of the bidder player when the exchange process is terminated. As shown in FIG. 14, the error page 140 may be sent to the terminal device 30 as a response to the exchange request sent from player 5. As shown, the error page 140 displays a message stating that the exchange process has been terminated. This error page may be provided to the terminal device 30 of a player only when the player first undergoes termination of the exchange process as a result of determination by the determination unit 58. In later cases, the process may omit display of the error page 140 and proceed to step 816 to perform exchange process with the online game administrator.

As described above, in an embodiment of the present invention, the exchange of an exhibited game content and a bid game content required to be exchanged may be concluded only when the difference in value between the game contents lies within a predetermined range (conversely, the exchange may not be concluded when the difference lies outside the predetermined range). Thus, the exchange of game contents having largely different values can be prevented from being concluded. Since typical real money trade is conducted through exchange of game contents having largely different values, such real money trade can be prevented if an exchange of an exhibited game content and a bid game content included in an exchange request is concluded only when the difference in value between the game contents lies within a predetermined range.

Also, in an embodiment of the present invention, the information on the exhibited game content of the exhibitor player may be presented to the bidder player so that the presented information does not include the player specifying information that specifies the exhibitor player. Thus, in the sequential process of exchanging game contents in a game, a bidder player cannot specify the exhibitor player. In online games, the same or similar game contents may be exhibited by multiple players; and, even if players agree outside the game on payment of money in expense of a game content, the partner of trading outside the game cannot be specified in the game where player identification information is hidden, and thus the game content designated to be given in the agreement outside the game cannot be given in the game. Thus, if a function of preventing a partner of exchange of game contents from being specified is implemented in a game system, the function may inhibit real money trade.

Further, in another embodiment of the present invention, the information on the bid game content of the bidder player may be presented to the exhibitor player so that the presented information does not include the player specifying information that specifies the bidder player. Thus, the exhibitor player cannot specify the bidder player in the game. Accordingly, trading in reality is inhibited as in the above example wherein the exhibitor player is prevented from being specified.

In still another embodiment of the present invention, the information on the exhibited game content of the exhibitor player may be presented to the bidder player so that the presented information does not include the player specifying information that specifies the exhibitor player, while the information on the bid game content of the bidder player is presented to the exhibitor player so that the presented information does not include the player specifying information that specifies the bidder player. This embodiment further inhibits the partner of exchange of game cards in a game from being specified, thus effectively restraining real money trade.

Thus, a game system according to the embodiments of the present invention technically restrains real money trade.

Next, a game system according to another embodiment of the present invention will be described with reference to FIGS. 15a and 15b.

FIGS. 15a and 15b show examples of the group management table according to this embodiment provided to the server device 10 or a database communicatively connected to the server device 10. In the embodiment, the server device 10 may further comprise a group management unit (not shown). The group management unit may randomly group players of a game into a plurality of groups. For example, the group management unit manages groups of players with a group management table as shown in FIGS. 15a and 15b. In FIG. 15a, player 1, player 3, and player 5 are grouped in the first group represented by the group identification information "01," while player 2 and player 4 are grouped in the second group represented by the group identification information "02."

In an embodiment, the server device 10 may further comprise a group updating unit (not shown). The group updating unit may regularly or irregularly alter the grouping of the players in accordance with a certain algorithm. FIG. 15b shows an example of the group management table after the grouping is altered. In FIG. 15b, player 1 and player 2 are grouped in the first group represented by the group identification information "01," while player 3, player 4, and player 5 are grouped in the second group represented by the group identification information "02."

In the embodiment, the exhibition data generating/sending unit 56 may be configured to allow display of an exhibition screen only to players grouped in the same group as the exhibitor player. Supposing that player 1 exhibits a certain game content when players are grouped as shown in FIG. 15a, the exhibition data related to the exhibited game content of player 1 can be displayed in the game played by player 3 and player 5 in response to the requests from player 3 and player 5, but it cannot be displayed in the game played by player 2 and player 4. For example, even if the game content exhibited by player 1 satisfies the search conditions provided by player 2, the exhibition data of the exhibited game content of player 1 may not be displayed in the game played by player 2.

Further, the group management unit may manage a plurality of groups of players in association with each other. For example, the group management unit may associate a plurality of groups with each other by using a group classification table as shown in FIGS. 16a and 16b. The purpose of such association of groups is, for example, to limit the players allowed to obtain, access, or browse exhibition data. For example, in the example shown in FIG. 16a, group 1 is associated with groups 1, 5, and 21. In this case, the exhibition data related to a game content exhibited by a player in group 1 can be obtained and accessed by players in groups 1, 5, and 21 associated with group 1 but cannot be obtained or accessed by players in other groups.

Herein, a group allowed to obtain and access the exhibition data related to a game content exhibited by a player in a certain group may be referred to as an access-enabled group. The exhibition data generating/sending unit 56 provides exhibition data related to an exhibited game content exhibited by an exhibitor player only to players in groups associated with the group including the exhibitor player as an access-enabled group. For example, if the exhibitor player is in group 1, the exhibition screen is displayed only to players in groups 1, 5, and 21.

The group updating unit may regularly or irregularly alter the association of the groups in accordance with a certain algorithm. FIG. 16b shows an example of the group classification table after the association is altered. In the example shown in FIG. 16b, access-enabled group 1 remains unchanged, while access-enabled groups 2 and 3 are changed. Thus, access-enabled groups may be changed partially. As is obvious from FIGS. 16a and 16b, in an embodiment of the present invention, a group can be fixed as an access-enabled group with respect to the same group. That is, group 1 can be fixedly set as an access-enabled group with respect to group 1. Thus, an exhibition screen can be provided to players in the same group by fixing the group as an access-enabled group with respect to the same group. As stated above with reference to FIGS. 15a and 15b, an exhibition screen can be controlled to be displayed only to players in the same group as the exhibitor player. Such an example shown in FIGS. 15a and 15b can be regarded as an example of the embodiment shown in FIGS. 16a and 16b wherein a certain group is set as the access-enabled group with respect to the same group.

With such group management, even if players agree in reality on payment of money in expense of exchanged game contents, game contents cannot be exchanged in games between the players in different groups in the game. Since the grouping is randomly performed in accordance with a predetermined algorithm, a player cannot determine whether a trade partner in reality is in the same group. Thus, players are randomly grouped and game contents can be exchanged only between players in the same group, thereby inhibiting implementation of a trade in reality so as to restrain real money trades.

Further, grouping of players can be altered to conceal the grouping even after a player specifies his own group. Also, the access-enabled group can be altered to conceal the access-enabled group even after a player specifies an access-enabled group. Thus, real money trade can be effectively restrained.

In another embodiment of the present invention, the server device 10 may further comprise a player management unit (not shown). The player management unit can store, in the player management table shown in FIG. 17 for example, player identification information of players of the games dynamically associated with player identification information of other players. For example, a player can register other players as "companies." The players registered as "companies" can cooperate with each other to progress a game. "A company" is registered when an offer from one player to another player is accepted. It can also be canceled when any of the players performs the processing for canceling the registration of the "company."

In the embodiment, the exhibition data generating/sending unit 56 allows display of an exhibition screen only to players registered as "companies" of the exhibitor player. For example, when player 1 having registered "companies" as shown in FIG. 17 exhibits a game content, the exhibition screen related to the exhibited game content of player 1 is displayed only in games played by players 2 and 5 who are companies of player 1. Meanwhile, the exhibition screen related to the exhibited game content of player 1 is not displayed in games played by players 3 and 5.

Thus, even if players agree in reality on payment of money in expense of exchanged game contents, the game contents cannot be exchanged in games between the players not registered as "companies" in the game. Since the maximum number of "companies" registrable is usually limited, it is unlikely that "companies" are registered only to trade game contents. Thus, game contents are exchanged only between players registered as "companies," thereby inhibiting implementation of a trade in reality so as to restrain real money trades.

The invention has been explained based on the aspects deemed to be the most practical and desirable at the moment, but these explanations are directed only to explanation of the present invention and are not intended to limit the present invention to the disclosed embodiments. The explanations made herein are intended to include modifications within the purport and scope of the claims made to any feature of the above described embodiments and equivalents thereof. For example, combinations of a feature of any of the above described embodiments with one or more features of another embodiment are included in the scope of the present invention as far as possible.

The processes and procedures described and illustrated herein may be implemented by software, hardware, or any combination thereof including those explicitly stated in the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described in the specification are executed by a single apparatus, software, or component in the description, the processes and the procedures can be executed by a plurality of apparatuses, software, and components. Even if the data, tables, or databases described in the specification are stored in a single memory in the description, the data, tables, or databases may be dispersed and stored in a plurality of memories included in a single apparatus or in a plurality of memories dispersed and arranged in a plurality of apparatuses. The elements of the software and the hardware described in the specification can be integrated into fewer constituent elements or can be decomposed into more constituent elements.

With respect to the use of substantially any plural and/or singular terms herein, in addition to terms used without designation of being either plural or singular, those having skill in the art can translate from the plural to the singular and/or from the singular to the plural as is appropriate to the context.

What is claimed is:

1. A video game system for providing video games to terminal devices of one or more players via a network, the video game system comprising:

one or more processors configured to execute computer programs;

memory storage configured to store machine readable instructions, when executed, causing the one or more processors to execute an interactive game for providing the interactive game on the terminal devices;

an owned game content storage unit configured to store one or more first game contents owned by a first player among the one or more players in association with first player identification information identifying the first player, and to store one or more second game contents owned by a second player among the one or more players in association with second player identification information identifying the second player;

an exhibition request obtaining unit configured to obtain from the first player an exhibition request for exhibiting the first game contents;

an exchange request obtaining unit configured to obtain from the second player an exchange request for exchanging the second game contents for the first game contents;

a determination unit configured to determine whether or not to conclude an exchange of the first game contents and the second game contents based on comparison of a predetermined threshold value with a difference between a trade quantity of the first game contents and a trade quantity of the second game contents when the exchange request obtaining unit obtains the exchange request; and an updating unit configured to update the owned game content storage unit such that the first game contents are stored in association with the second player identification information and the second game contents are stored in association with the first player identification information only when the determination unit determines that the exchange is concluded.

2. The video game system of claim 1 wherein the determination unit specifies the trade quantity of the first game contents based on the exhibition request.

3. The video game system of claim 1 wherein the determination unit specifies the trade quantity of the second game contents based on the exchange request.

4. The video game system of claim 1 wherein the determination unit specifies the trade quantity of the first game contents and the trade quantity of the second game contents based on the exchange request.

5. The video game system of claim 1 wherein, when the determination unit determines that the exchange is not concluded, the updating unit erases the second game contents from the owned game content storage unit and updates the owned game content storage unit such that one or more game contents of a same type as the first game contents are stored in association with the second player identification information.

6. The video game system of claim 1 further comprising:
a player specifying information storage unit configured to store first player specifying information for specifying the first player and second player specifying information for specifying the second player; and
an exhibition data sending unit configured to generate, based on the exhibition request, exhibition data including first game content information on the first game contents but not including the first player specifying information and to send the generated exhibition data to the terminal device of the second player.

7. The video game system of claim 1 further comprising:
a player specifying information storage unit configured to store at least first player specifying information for specifying the first player and second player specifying information for specifying the second player;
an exchange request sending unit configured to generate, based on the exchange request, bid data including second game content information on the second game contents but not including the second player specifying information and to send the generated bid data to the terminal device of the first player.

8. A method using a game computer for providing video games to terminal devices of one or more players via a network, each of the game computer and the terminal devices having one or more processors configured to execute computer programs and a memory storage configured to store machine readable instructions, when executed, causing the one or more processors to execute an interactive game for providing the interactive game on the terminal devices, the method comprising the steps of:
storing one or more first game contents owned by a first player among the one or more players in association with first player identification information identifying the first player, and storing one or more second game contents owned by a second player among the one or more players in association with second player identification information identifying the second player;
obtaining from the first player an exhibition request for exhibiting the first game contents;
obtaining from the second player an exchange request for exchanging the second game contents for the first game contents;
determining whether an exchange of the first game contents and the second game contents is concluded based on comparison of a predetermined threshold value with a difference between a trade quantity of the first game contents and a trade quantity of the second game contents when the exchange request obtaining unit obtains the exchange request; and
updating the owned game content storage unit such that the first game contents are stored in association with the second player identification information and the second game contents are stored in association with the first player identification information only when the step of determination determines that the exchange is concluded.

9. The video game system of claim 1, wherein the determination unit determines that the exchange of the first game contents and the second game contents is not concluded when the difference is larger than the predetermined threshold value.

* * * * *